(12) United States Patent
Finnerty et al.

(10) Patent No.: US 9,900,640 B2
(45) Date of Patent: Feb. 20, 2018

(54) CONTENT CONSUMPTION AND INTERACTIVITY AT A DEVICE

(71) Applicant: COX COMMUNICATIONS, INC., Atlanta, GA (US)

(72) Inventors: Nadine Finnerty, Atlanta, GA (US); Keith Alan Rothschild, Atlanta, GA (US); Roy Edmond Pereira, Atlanta, GA (US); Roy Roger Toney, Jr., Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 13 days.

(21) Appl. No.: 14/214,444

(22) Filed: Mar. 14, 2014

(65) Prior Publication Data
US 2015/0256866 A1    Sep. 10, 2015

Related U.S. Application Data

(60) Provisional application No. 61/949,198, filed on Mar. 6, 2014.

(51) Int. Cl.
| | |
|---|---|
| *H04N 21/258* | (2011.01) |
| *H04N 21/2668* | (2011.01) |
| *H04N 7/16* | (2011.01) |
| *H04N 7/173* | (2011.01) |
| *H04N 21/2385* | (2011.01) |

(Continued)

(52) U.S. Cl.
CPC ....... *H04N 21/25891* (2013.01); *H04N 7/162* (2013.01); *H04N 7/17318* (2013.01); *H04N 21/2385* (2013.01); *H04N 21/2396* (2013.01); *H04N 21/2541* (2013.01); *H04N 21/25816* (2013.01); *H04N 21/2665* (2013.01); *H04N 21/2668* (2013.01); *H04N 21/4122* (2013.01); *H04N 21/4383* (2013.01); *H04N 21/4722* (2013.01); *H04N 21/4788* (2013.01); *H04N 21/47815* (2013.01); *H04N 21/4823* (2013.01); *H04N 21/632* (2013.01); *H04N 21/812* (2013.01); *H04N 21/84* (2013.01); *H04W 4/08* (2013.01); *H04W 4/206* (2013.01); *H04N 2007/17372* (2013.01)

(58) Field of Classification Search
CPC . H04N 21/482; H04N 5/4403; H04N 21/4126
See application file for complete search history.

(56) References Cited

U.S. PATENT DOCUMENTS

| | | | | |
|---|---|---|---|---|
| 6,097,441 | A * | 8/2000 | Allport | 348/552 |
| 2002/0162121 | A1* | 10/2002 | Mitchell | H04N 7/165 725/135 |

(Continued)

*Primary Examiner* — Olugbenga Idowu
(74) *Attorney, Agent, or Firm* — Eversheds Sutherland (US) LLP

(57) ABSTRACT

Aspects of the disclosure relate to configuration of content and consumption thereof content in a networked environment. In certain aspects, the consumed content can be coordinated or otherwise synchronized between disparate consumption devices, which may be served content via different content platforms. In another aspect, the consumed content can be customized for a specific device and/or an end-user thereof. In yet another aspect, recommendations for content and/or products associated with at least a portion of the content can be provided.

15 Claims, 20 Drawing Sheets

(51) Int. Cl.
  *H04N 21/239*    (2011.01)
  *H04N 21/254*    (2011.01)
  *H04N 21/2665*   (2011.01)
  *H04N 21/438*    (2011.01)
  *H04N 21/482*    (2011.01)
  *H04N 21/84*     (2011.01)
  *H04N 21/41*     (2011.01)
  *H04N 21/4722*   (2011.01)
  *H04N 21/478*    (2011.01)
  *H04N 21/4788*   (2011.01)
  *H04N 21/81*     (2011.01)
  *H04N 21/63*     (2011.01)
  *H04W 4/08*      (2009.01)
  *H04W 4/20*      (2018.01)

(56) References Cited

U.S. PATENT DOCUMENTS

| | | | | |
|---|---|---|---|---|
| 2005/0177861 A1* | 8/2005 | Ma | .................. | H04N 5/4403 |
| | | | | 725/135 |
| 2008/0010652 A1* | 1/2008 | Booth | .................. | H04L 12/14 |
| | | | | 725/1 |
| 2009/0150553 A1* | 6/2009 | Collart | .............. | G06F 17/30017 |
| | | | | 709/229 |
| 2013/0036440 A1* | 2/2013 | Eyer | .................. | H04N 21/472 |
| | | | | 725/40 |
| 2013/0267168 A1* | 10/2013 | Jeon | .................. | H04B 5/0025 |
| | | | | 455/41.1 |
| 2014/0244827 A1* | 8/2014 | McCoy | ................ | H04L 43/045 |
| | | | | 709/224 |

\* cited by examiner

CONTENT CONSUMPTION AND INTERACTIVITY AT A DEVICE

CROSS-REFERENCE TO RELATED APPLICATIONS

This application claims the benefit of U.S. Provisional Patent Application No. 61/949,198, filed on Mar. 6, 2014, the entirety of which is incorporated herein by reference. This application also is related to U.S. patent application No. (not yet assigned), filed on Mar. 14, 2014, and entitled "CONTENT SHAPING AND DISTRIBUTION AT A CONTENT PLATFORM;" U.S. patent application No. (not yet assigned), filed on Mar. 14, 2014, and entitled "CONTENT CUSTOMIZATION AT A CONTENT PLATFORM;" U.S. patent application No. (not yet assigned), filed on Mar. 14, 2014, and entitled "THEMATIC PROGRAMMING CHANNEL;" the entirety of each of the above-captioned applications is incorporated herein by reference.

BACKGROUND

Conventional distribution of digital content generally is provided within a downstream paradigm where the content typically is configured at the platform and provided without significant up-stream input. Further, conventional distribution generally incorporates a replicative approach to delivery of content on end-point devices, where second devices merely serve as handover centers with only marginal interactivity functionality.

BRIEF DESCRIPTION OF THE DRAWINGS

The accompanying drawings form an integral part of the disclosure and are incorporated into the present specification. The drawings illustrate examples of embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like, but not necessarily the same or identical, elements throughout.

DETAILED DESCRIPTION

Figure 1:
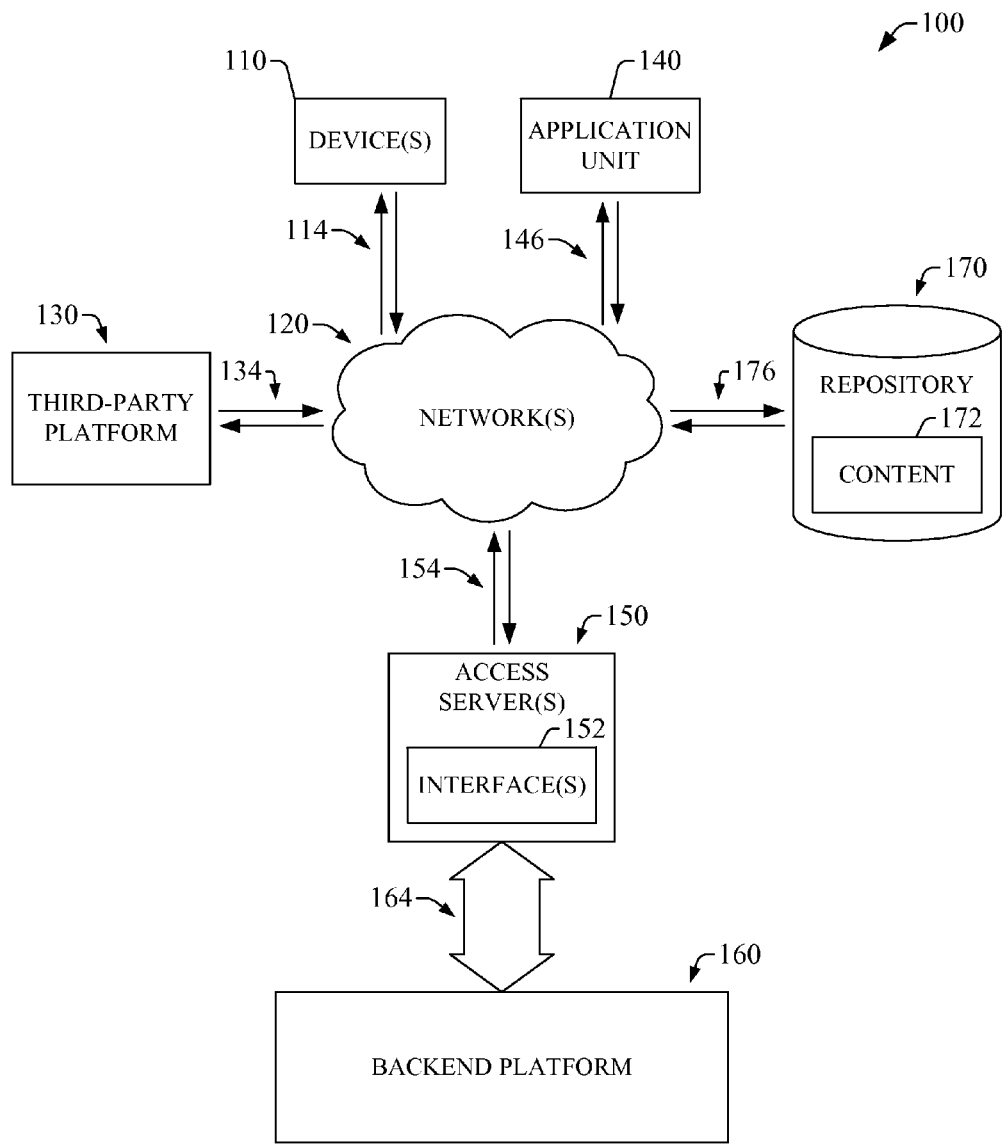
FIG. 1 presents an example of an operational environment in accordance with one or more aspects of the disclosure.

The disclosure recognizes and addresses, in at least certain aspects, the issue of digital content distribution from a service provider and consumption of such content, and the lack of configuration and/or customization of such content based on up-stream information. The disclosure provides devices, systems, techniques, and/or computer program products for shaping and/or distribution of digital content and/or consumption of same. As described in greater detail below, in certain aspects, the disclosure relate to configuration of content and consumption thereof content in a networked environment. In certain aspects, the consumed content can be coordinated or otherwise synchronized between disparate consumption devices, which may be served content via different content platforms. In another aspect, the consumed content can be customized for a specific device and/or an end-user thereof. In yet another aspect, recommendations for content and/or products associated with at least a portion of the content can be provided. In still other aspects, the disclosure permits organization and/or categorization of different types of multimedia assets (which also may be referred to as media assets) via metadata. For example, such organization and/or categorization can permit access to media assets for consumption in targeted advertising, content personalization, commercial transactions, combinations thereof, and the like. Media assets can be categorized according to one or more of content provider, genre, age demographic, geographical location, media type, subject matter, format, length of asset, or the like. A media asset can embody or can constitute digital content, such as video content, music content, graphical content, digital games, electronic books, a combination thereof, or the like.

In addition, media assets can be digitally shaped or otherwise conditioned in order to introduce markers in linear media assets, on-demand media assets, and/or time-shifted media assets to synchronize with a second-screen device. Such synchronization may be utilized or otherwise leveraged to transfer viewing from a first device (e.g., a first-screen device) to a second device (e.g., a second-screen device); to trigger actions in the lifecycle of an application module executing in the second device; to cause advertisement to be rendered at the second device at defined instances (such as specific times or in response to specific rendered content) during playback of a media asset (e.g., a video asset, or a music asset); combinations of the foregoing, or the like. In addition or in the alternative, digital shaping of media assets can be utilized or otherwise leveraged for synchronization with the second device (e.g., the second-screen device), and/or to set trick-play points in the case of transferring viewing between the first device and the second device (e.g., the second-screen device).

The disclosure also permits dynamic acquisition of assets from a third-party platform (e.g., business partner, advertiser, content generator, or the like). In certain embodiments, such acquisition can be implemented via, for example, a software application at runtime. In one example, the acquisition can permit the application to register with our backend platform with the size of content to be allowed, along with a list of whitelist and blacklist keywords to be associated with the control. In another example, using sign-in credentials and/or elements in subscriber profiles or manifests, specific media assets can be provided to a consumption device at specific times and/or in response to specific events. Interaction of a consumption device (e.g., a second-screen device, such as a mobile computing device) with a media asset can be leveraged to generate consumer analytics that can be leveraged to shape content (e.g., generate content, categorize content, customize content, combinations thereof, or the like) available for consumption at a distribution platform.

In addition or in the alternative, the disclosure can permit digital shaping of time-shifted media assets and/or on-demand media assets based on consumption context of such an asset. The digital shaping can include, in one aspect, expansion or contraction of such media asset(s). For example, in a cooking show, embodiments of the disclosure can identify in a media asset that presents the details of preparation of the dish, when a dish is about to be placed in an oven or other cooking device. In addition, based on a predetermined cooking time for the dish, the disclosure can inject content (which may be referred to as "holding content") and then can return to playback of the original media asset at the end of the cooking time. In an example, the "holding content" can include an infomercial that may be related to the dish being prepared and/or the cooking device utilized to prepare the dish. It should be appreciated that such functionality can permit an end-user to "follow" along the cooking show in that the cooking media asset that presents the details of preparation of the dish can be rendered alternately with other content during a time interval that is congruent or substantially congruent with the duration of preparation and cooking time of the dish.

In certain aspects, the disclosure can utilize or otherwise leverage information (e.g., data, metadata, and/or signaling) from a recommendation engine in order to drive subscriber profile creation. In one aspect, a profile so created can be utilized for rich consumer-specific advertising or to direct a consumer to utilize additional services available from the service provider, such as video-on-demand (VOD) services. In certain embodiments, generation of such a profile can include composition of a thematic channel, such as a linear channel having highly customized content. The thematic channel may be referred to as super-channel. An interface for operation in combination with the thematic channel may be provided for interactivity (such as upstream communication of responses to surveys and/or communication of requests for more information, combinations thereof, or the like) and/or to provide additional information indicative or otherwise representative of the super channel or associated thereof (such as information associated with commercial transactions, information directed to a social media platform (e.g., a tweet or a posting on Facebook). The interface can include graphical component(s) that can permit a second screen device to acquire or otherwise receive information associated with interaction with content presented at or otherwise associated with the thematic channel. The interface or a portion thereof may be contained in an application module associated with the thematic channel.

Feedback and/or information indicative or representative of usage of the interactive portion of a thematic channel in accordance with this disclosure can be supplied to a recommendation engine (which also may be referred to as an analytics engine) to refine and/or enhance an end-user's experience when consuming content via a thematic channel and/or media conduits of a content consumption platform in accordance with this disclosure. In addition or in the alternative, the disclosure can permit configuration (e.g., generation, adaptation, customization, a combination thereof, or the like) of a thematic linear channel using assets injected and scheduled through a contact provider portal or platform. In one aspect, media assets can be accessed from a content delivery network or a VOD system via a content curation system, and the linear channel can be digitally shaped or otherwise configured via metadata defined by the content provider.

In addition or in the alternative, the disclosure can permit content providers to inject media assets (audio, image, video, etc.) for utilization in various architectures, such as themed-based channels, targeted advertising, combinations thereof, or the like. Embodiments of the disclosure can configure roles and scheduling information in addition to metadata that can be utilized or otherwise leveraged in order to associate injected content with a specific channel or content container.

Embodiments of the disclosure can provide various advantages over conventional technologies for digital content distribution and/or configuration. One example advantage may include configuration and/or communication of content. Another example advantage may include a rich customization of content based on behavioral aspects of a consumer of content, where behavior of a consumer can be identified at least via consumption activity and consumer-driven and/or operator-driven configuration of content for consumption.

With reference to the drawings, FIG. 1 presents an example of an operational environment 100 for content shaping and/or consumption in accordance with at least certain aspects of the disclosure. As illustrated, the operational environment 100 can include a group of one or more devices 110 functionally coupled to a group of one or more networks 120 via links 114. Such a coupling can include one-to-one coupling in which a device of the device(s) 110 is functionally coupled to a single network of the network(s) 120. In scenarios in which the network(s) 120 include at least two networks, the functional coupling between device(s) 110 and network(s) 120 can include one-to-many couplings where a device of the device(s) 110 can be functionally coupled to two or more of the network(s) 120. The devices(s) 110 and other devices contemplated in the disclosure include electronic devices having computational resources, including processing resources (e.g., processor(s)), memory resources (memory devices (also referred to as memory), and communication resources for exchange of information within an electronic device embodying or constituting a device and/or with other electronic devices. Such resources can have different levels of architectural complexity depending on specific device functionality. The electronic devices contemplated in this disclosure can include desktop computers; mobile computers (e.g., laptop computers, tablet computers, smartphones or other mobile telephones, or the like); point-of-sale computers; magnetic-card reader devices; optical reader devices; near-field communication (NFC) devices; gaming consoles; wearable computing devices; or the like. In certain embodiments, at least some of the device(s) 110 can include first-screen (e.g., CPE) and second-screen (e.g., computers, mobile, etc.) devices. In addition, one or more of the device(s) 110 can be associated with a subscriber or otherwise consumer of a service provider that administers at least one of the network(s) 120. For example, the service provider may be a multi-system operator (MSO) that administers (e.g., designs, deploys, maintains, and/or leverages) a cable network and supplies information, such as data and/or metadata, or provides network-based solutions (such as a cloud solution including hardware, software, and/or service(s)) to a device of the device(s) 110.

The network(s) 120 can include wireless network(s), such as packet-switched network(s) or circuit-switched network(s); wireline network(s), such hybrid fiber-coaxial (HCF) network(s) or passive optical network(s) (PON(s)); combinations thereof (e.g., an IP multimedia system (IMS) network and a cellular telecommunication network); or the like. Similarly, links 114 can include upstream link(s) (UL(s)) and/or downstream link(s) (DL(s)), where the UL(s) and DL(s) include wireless link(s), wireline link(s), or combination(s) thereof. Other links described or referred to in the present disclosure also can include UL(s) and/or DL(s), each including wireless link(s), wireline link(s), or combination(s) thereof.

At least one of the device(s) 110 can be referred to as a consumption device, which can receive a media asset via a wireline network, a wireless network, or a combination thereof, according to one or more digital communication protocols. Such network(s) can be embodied in or contained within the network(s) 120. In certain embodiments, the consumption device can be embodied in or can constitute a terminal device functionally coupled to a consumer premises equipment having a network interface device, and wherein the supplying comprises supplying the conditioned media asset to the terminal device via a passive optical network (PON) according to internet protocol over PON. In other embodiments, the consumption device can be embodied in or can constitute a terminal device (e.g., a monitor or a television set) functionally coupled to a consumer premises equipment, where a media asset can be supplied to the terminal device via a hybrid fiber-coaxial (HFC) network according to data over cable service interface specification (DOCSIS) protocol. It should be appreciated that, in certain implementation, the terminal device can have the CPE functionality embedded therein, either as an application or through the use of separable security component(s). In yet other embodiments, the consumption device can be embodied in a terminal device wirelessly functionally coupled to a consumer premises equipment, where the terminal device (e.g., a mobile computing device) can receive a media asset (conditioned or raw) via a content distribution network (CDN) functionally coupled to a termination system, the conditioned media asset is supplied according to internet protocol (IP) and (DOCSIS) protocol. While in some of the embodiments described herein the terminal device may be functionally coupled to the backend platform 160, other embodiments are contemplated in this disclosure where the terminal device (which may be referred to as a first-screen device) may be connected via internet protocol (IP) or other packet-switched protocol. In addition, here PON can include IP/PON (such as EPON, GPON, etc.) or RFOG (which can be different than HFC in that there is no coaxial cables in the plant, only in a home where the terminal device is located). In one example, the backend platform 160 can include various components that permit operation of a network that can distribute content and provide services. For instance, the backend platform 160 can include servers, content distribution network(s), middleware components, combinations thereof, and the like.

The functional coupling between device(s) 110 and network(s) 120 can permit a device of the device(s) 110 to communicate (e.g., receive information, transmit information, or exchange information) with a third-party platform 130 via links 134. The third-party platform 130 can be associated with a content generation platform (such as a platform that can generate syndicated content (e.g., a radio station or a television station) or other programming); an advertiser platform; or a marketing platform. As an illustration, a content generation platform can be embodied in or can include a linear-programming network, a multimedia studio, a web-based content publisher (e.g., a blog, a microblog, a web-based outlet of a printed-media publisher), a combination thereof, or the like. In addition or in the alternative, the device can communicate with a network element of a service provider platform via links 154. To at least such an end, the device can communicate with at least one server of a group of access servers 150 (referred to as access server(s) 150), which is functionally coupled to a backend platform 160 via a communication platform 164. In certain embodiments, the communication platform 164 can be embodied in or can include a network, link(s), and the like.

The operational environment 100 also can include an application unit 140 functionally coupled to at least one of the network(s) 120 via link(s) 146. Such a functional coupling can permit the application unit 140 to communicate with the third-party platform 130 and/or at least one of the access server(s) 152. The at least one access server can permit communication between the application unit 140 and the backend platform 160. While the application unit 140 is illustrated as a stand-alone functional element of the operational environment 100, the application unit 140 can be integrated into or otherwise contained in a device of the device(s) 110.

As illustrated, the access server(s) 150 can permit access to the backend platform 160 at a single point of entry. Such a configuration can simplify management or implementation of access to backend platform 160 and associated functionality (e.g., computing, storage, information transportation, and the like). In certain implementations, the access server(s) 150 can include a plurality of servers (hardware servers, software servers, or a combination thereof) in order to provide redundancy and thus mitigate functional failure. As illustrated, at least one (e.g., one, two, more than two, or each) of the access server(s) 150 can include a group of interfaces 152 (which may be referred to as interface(s) 152). The interface(s) 152 can include at least one application programming interface (API), at least one graphical user interface (GUI), at least one display device, combinations thereof and the like. In certain implementations, the interface(s) 152 can be configured (e.g., encoded, compiled, and/or retained) within an interface server (not depicted in FIG. 1). In one aspect, the interface server can be referred to as an API server, and can contain one or more interfaces of the interface(s) 152 that can be embodied in or can constitute an API. In certain implementations, one or more of the interface(s) 152 can permit maintaining APIs that can permit development (e.g., modification and/or extension of current functionality of the application unit 140) at the backend platform 160 without an application upgrade. In addition, one or more of the interface(s) 152 can hide details (e.g., configuration details and/or architectural details) of the backend platform 160 beyond a logical and/or physical address (such as an IP address), and/or the authorization scheme that may be relied upon for access to the backend platform 160. Further, at least some of the interface(s) 152 can permit disabling functionality not available to the application unit 140, which can permit, in one aspect, reducing or avoiding error checking that may be performed by the application unit 140.

Figure 2:
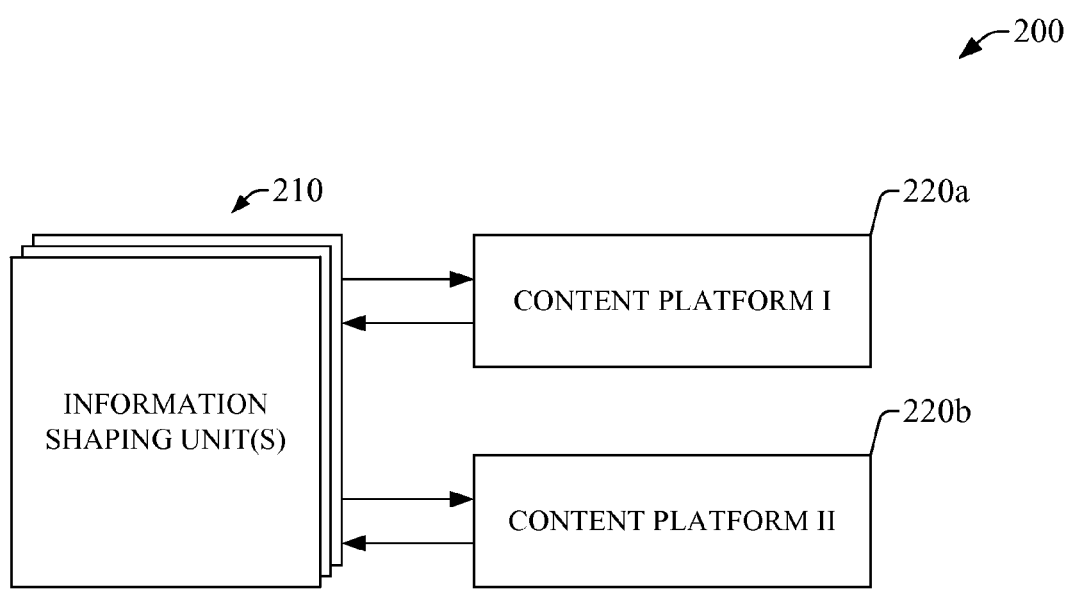
FIGS. 2-3 present examples of systems in accordance with one or more aspects of the disclosure.

One or more interfaces of the interface(s) 152 can permit communication between the third-party platform 130 and the access server that contains the one or more interfaces. In addition, the one or more interfaces can permit communication between such an access server and the backend platform 160 or components thereof. Accordingly, in certain implementations, the one or more interfaces can permit communication between the third-party platform 130 and a component (e.g., a content system) associated with (e.g., integrated into or functionally coupled to) the backend platform 160. It should be appreciated that, in other implementations, the one or more interfaces can permit communication between other network elements, such as a device of the device(s) 110, and a component associated with the backend platform 160. In one of communication, an interface of the interface(s) 152 can permit management of content, such as media assets, that may be accessible to the backend platform 160. As illustrated, at least a portion of such content can retained in one or more memory elements (referred to as content 172) within a repository 170, which can be functionally coupled (e.g., communicatively coupled to the access server(s) 150 by means of, at least, the network(s) 120. In one example, the content can be a subscriber or end-user library of assets, which can be customized based on consumption behavior of the subscriber or the end-user. Management of content can include configuration, such as synchronization of consumption of media assets between two or more content systems of the backend platform 160, and establishment of conditions that trigger specific action (e.g., rendering, queuing, or the like) associated with a media asset. Accordingly, an interface of the interface(s) 152 that permit such management can embody or can constitute an information shaping unit. In certain implementations, a condition that trigger a specific action can be referred to as a consumption rule associated with consumption of the media asset. For example, the consumption rule can dictate one or more of scheduling of the media asset or playback of a second media asset. In one aspect, a consumption rule for a media asset can be referenced or otherwise pointed to by metadata contained in the media asset. FIG. 2 presents an example of a system that leverages information shaping units for management of content across two disparate content platforms 220a and 220b in accordance with one or more aspects of this disclosure. It should be appreciated that the content platforms 220a and 220b can form a distributed content platform. In one implementation, a group of one or more information shaping units 210 can embody or can constitute a content synchronization platform (also referred to as "content synchronization portal").

Figure 3:
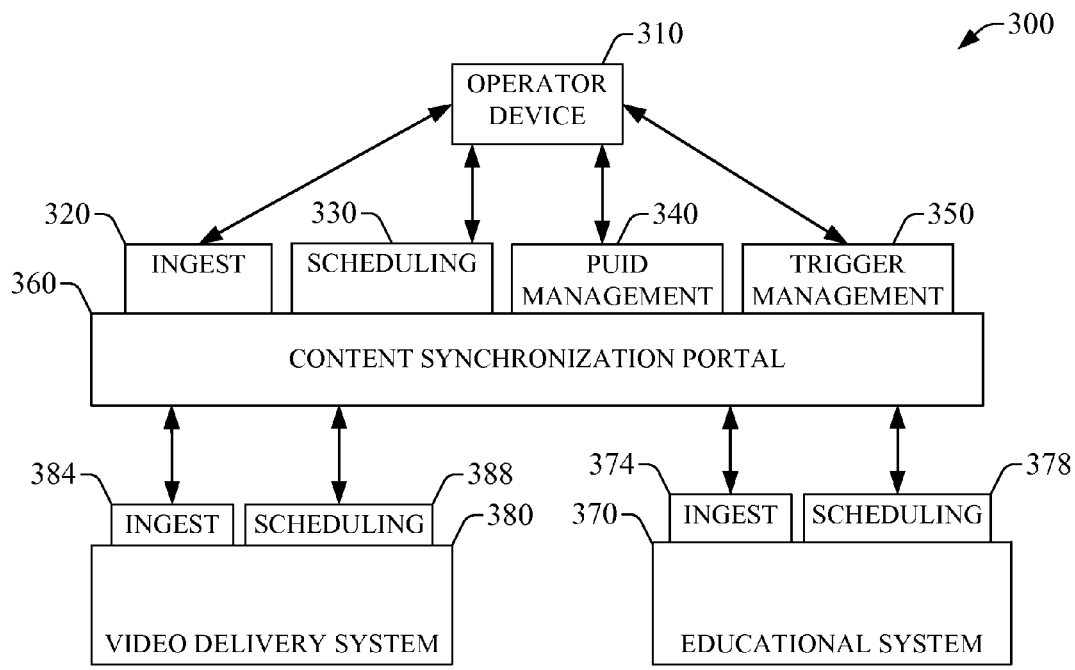

As illustrated in the example operational environment 300 shown in FIG. 3, a content synchronization portal 360 in accordance with aspects of this disclosure can operationally couple systems for consumption of content via a single point of entry for operators (e.g., a third-platform operator) to ingest and/or schedule content across such systems from a common interface or platform. As such, in one aspect, the content synchronization portal 360 can provide interfaces (APIs or other libraries, middleware, combinations thereof, or the like) to each of the systems that it can couple operationally, where the interfaces can permit ingest and/or scheduling of content (such as media assets). As an example, the content synchronization portal 360 can provide an ingest interface 320 (also referred to as ingest 320) and a scheduling interface 330 (also referred to as scheduling 330) to a video delivery system 380 in order to permit, respectively, ingest and scheduling of content (e.g., media assets, such as video assets). As illustrated, in one aspect, the video delivery system 380 also can include an ingest interface 384 (also referred to as ingest 384) and a scheduling interface 388 (also referred to as scheduling 388) that can permit operational coupling (e.g., communicative coupling) with the ingest 320 and the scheduling 330, respectively. As another example, the content synchronization portal 360 also can provide interfaces (e.g., APIs or other libraries, middleware, combinations thereof, or the like) that permit functional coupling to an educational system 370, such as a learning management system (LMS) or a learning content management system (LCMS). While the operational environment 300 is illustrated with reference to the video delivery system 380 and to the educational system 370, other systems for management and/or consumption of content can be contemplated.

In one aspect, the content synchronization portal 360 can register participating systems, such as the video delivery system 380 and the educational system 370 (e.g., a learning management system). Therefore, in another aspect, during a registration process of the participating systems, the content synchronization portal 360 can identify the types of interfaces each system can support and/or the types of content (e.g., media assets) that can be reproduced (e.g., played back on each system. For instance, the content synchronization portal 360 can identify that the video delivery system 380 can support the ingest 384 and the scheduling 388, and that the educational system 370 can support the ingest 374 and the scheduling 378.

In response to registration of a system (e.g., video delivery system 380 and/or educational system 370), media assets ingested in the backend platform 160 and/or retained in the repository 170 can be tagged or otherwise augmented with metadata that can identify the information respectively associated with the media assets. In one implementation, the metadata can be embodied in or can include a content unique identifier (CUID), which also may be referred to as content unique identification. In one aspect, CUIDs can be tagged or otherwise augmented with respective metadata indicative of a type of content (e.g., video; audio; image, such as presentation slide; document; etc.). It should be appreciated that in certain embodiments, augmentation or otherwise tagging with metadata can be implemented via reference. More specifically, yet not exclusively, augmentation-by-reference as utilized herein refers to configuration of a logical reference (e.g., metadata object, a pointer, a hyperlink, a combination thereof, or the like) to metadata stored or retained in a database or other repository (such as repository 170). In certain example embodiments, the metadata can be associated with the media asset by ways of a reference (e.g., provider identifier/provider assets identifier (PAID (PID/PAID) or Source ID/Broadcast Time). In one aspect, the content type definition can include metadata that can map a media asset associated with the CUID to a system in which the media asset can be consumed (such as the educational system 370 (e.g., a LMS), the video delivery system 380, or the like). In addition or in the alternative, the content type definition can include metadata that can identify a condition for consumption of the media asset associated with the CUID. Such a condition may be referred to as a "trigger" and can be evaluated with respect to an event by a trigger management module 350. Put more simply, yet not exclusively, the trigger can be determined to be logically true or logically false based at least on information received at the backend platform 160 in response to an event associated with consumption a media asset containing the trigger. Accordingly, in one aspect, a trigger can have a specific type which is indicative of the type of condition associated with the media asset that contains the trigger. For example, a media asset can contain a trigger having an advertisement type, where the media asset may be consumed (e.g., rendered in a device of the device(s) 110) as part of a promotional campaign. For another example, a media asset can contain a trigger having an interactive type, where the media asset can be consumed in response to information received from a device (e.g., a second-screen device) in which the media asset is consumed.

Figure 4:
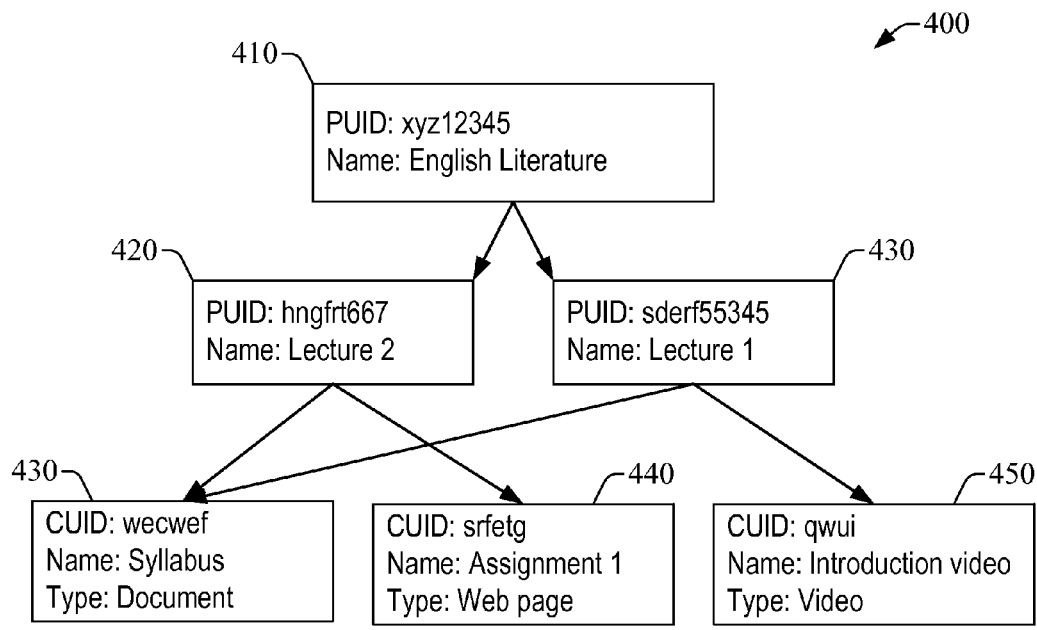
FIG. 4 presents an example of hierarchical categorization of content in accordance with one or more aspects of the disclosure.

Additionally, in certain embodiments, a media asset can be assigned or augmented with metadata that further identifies the media asset. In one example implementation, the metadata can be embodied in or can contain one or more package unique identifiers (PUIDs), which also may be referred to as package unique identifications. As illustrated in the example environment 300, the content synchronization portal 360 can provide an interface, e.g., PUID management interface 340 (which also may referred to as PUID management 340), that can permit augmentation with or assignment of such metadata to a media asset. As illustrated in diagram 400 in FIG. 4, PUIDs can be hierarchical, and can be generated and organized to represent a relationship between media assets. An operator of the content generation platform (e.g., a studio or learning institution) that can provide the media asset or an operator of a service provider that can supply the media asset can generate PUIDs and/or can construct a desired or intended relationship between media assets. In one aspect, at least some individual media assets with a CUID (e.g., 430, 440, 450) on ingest may be assigned one or more PUIDs by an end-user device (e.g., operator device 310 associated with an operator of the third-party platform 130). A specific PUID grouping can be used or otherwise leveraged to determine how individual media assets relate to each other regardless of the system (e.g., the video delivery system 380 or the educational system 370) in which the assets can be scheduled to be consumed. For example, a device associated with an operator of a content generation platform or a service provider can generate a PUID 410 for the course English Literature. In addition, child PUIDs of the English Literature PUID 410 can be generated for each week during the course—e.g., PUID 430 for Lecture 1 and PUID 420 for Lecture 2. Upon or after creation of a hierarchy or other categorization of PUIDs, media assets (e.g., images, such as slides; video content; audio content; and/or other class materials) that can be assigned to the English Literature PUID 410 and the individual week PUIDs 420 and 430. To at least such an end, in one aspect, an ingested media asset can be augmented or otherwise tagged with a CUID and at least two PUIDs, as illustrated in diagram 400 in FIG. 4.

The content synchronization portal 360 can present available PUIDs to an operator of a content generation platform (e.g., a studio or learning institution) or to an operator of a service provider. In response (e.g., upon or after) selection of the desired PUID, the operator can access or otherwise receive the available media assets that can then be scheduled for delivery on a content delivery system that is registered with the content synchronization portal 360, such as the educational system 370 or the video delivery system 380. The content delivery system can utilize or otherwise leverage the available interfaces to these systems (e.g., scheduling 330, scheduling 388, and scheduling 378) to provide scheduling instructions the systems depending on the type of asset. In an additional or alternative aspect, related media assets can be setup or otherwise configured to trigger the delivery or playout of other related content across device types (e.g., a first-screen device, a second-screen device, . . . ). The content synchronization portal 360 can permit an operator to select and/or configure the trigger based at least on asset type of a media asset and/or target device in which the media asset can be consumed on.

In certain embodiments, the content synchronization portal can permit assigning or augmenting a media asset with metadata at a predetermined point in the media asset. More specifically, yet not exclusively, such metadata can represent or reference (e.g., point to) an asset marker, where the asset marker can be or can include an indicator of when in the play-out of the media asset an action can be performed. In addition or in the alternative, the media asset can indicate or otherwise represent the appropriate time, or can indicate or otherwise represent the appropriate time and a list of parameters indicative or otherwise representative of an action that may be taken or an event that may be configured to occur at the indicated time.

As described herein, the application unit 140 and/or at least one of the device(s) 110 can access information (e.g., data, metadata, and/or signaling) from a source platform (e.g., a server or repository associated with a service or network-based functionality). To at least such an end, in one aspect, at least one of the network(s) 120 can permit communication between the application unit 140 and/or the at least one of the device(s) 110. In addition, content and/or other information consumed via the application unit 140 can be related to content consumed at a device of the device(s) 110. More specifically, yet not exclusively, in one aspect, a media asset consumed at the application unit 140 can be selected or otherwise identified based at least in part on content that is consumed at the device of the device(s) 110. Such a media asset can be or can contain an advertisement asset or a thematic asset (e.g., a cooking recipe). In addition, in another aspect, content and/or other information can be responsive, at least in part, to the content that is consumed via the device of the device(s) 110. For instance, a recommendation (e.g., a product recommendation or a recommendation for travel) can be received at the application unit 140 in response to the specific content being rendered at the device of the device(s) 110. It should be appreciated that, in one aspect, such a responsiveness permits interactive consumption of content and/or information at the application unit 140. Put more simply, in one aspect, the manner and/or type of content that is consumed at the application unit 140 can be determined or otherwise dictated by the content that is consumed via another device (e.g., a set-top box).

Figure 5:
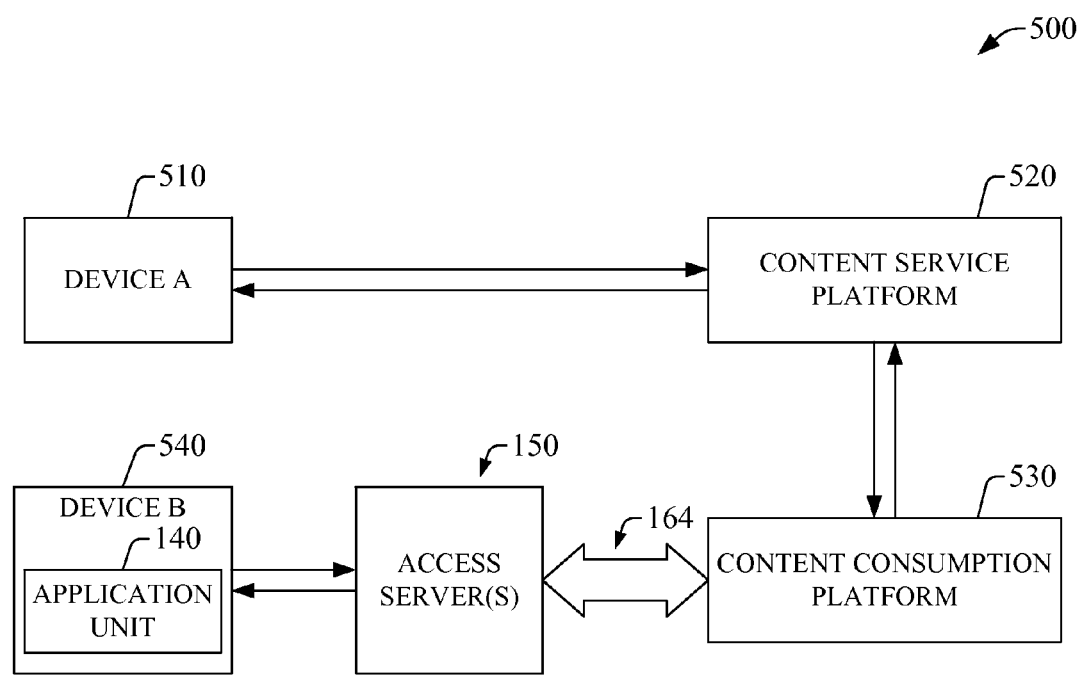
FIGS. 5-8 present examples of operational environments in accordance with one or more aspects of the disclosure.

In certain embodiments, such as example embodiment 500 illustrated in FIG. 5, synchronization of content and/or interactivity between a device A 510 (e.g., a set-top box) and a device B 540 (e.g., a mobile device, such as a tablet computer) can be implemented, at least in part, via a content consumption platform 530 at the backend network 160. As illustrated, the device B 540 and the content consumption platform 530 can communicate via an access server of the access server(s) 150. To at least such an end, the device B 540 can include an application unit 140 that can permit interfacing with at least one of the interface(s) 152 that can be included in the access server. The application unit 140 can include an application framework that can permit authentication and connection to the access server, where the connection may be obfuscated in order to prevent unauthorized access. In addition, the application unit 140 can include a control unit (not shown in FIG. 5) that can permit control of content that may be consumed (e.g., rendered, requested, queued, a combination thereof, or the like) at the device B 540. In one example, such a control unit can leverage container-like functionality and, in one aspect, can configure type of media assets to be consumed, e.g., content, advertisement, entertainment, and the like). A media asset associated with certain type of asset can be assigned or otherwise associated with a "type-tainer," such as a "ad-tainer" or "enter-tainer," which can establish an asset wrapper (e.g., a container) that can be utilized or otherwise relied upon by the access server(s) 150 to serve content to the device B 540. In addition or in the alternative, a type-tainer in accordance with this disclosure can permit configuring trigger(s) as described herein that can permit consumption of an asset (e.g., communication of the asset) at the device B 540 via a call to at least one interface of the interface(s) 152 (not shown in FIG. 5). In certain implementations, a type-tainer can remain dormant or otherwise transparent to the access server(s) 150 until a function call is directed to the at least one interface in order to render the asset.

In one aspect, the device B 540 (also referred to as a second screen) can subscribe, via the access server(s) 150, for example, to consumption of event notifications at the content consumption platform 530, where the event notifications are associated with events, or actions, that can occur on the device A 510 (also referred to as a primary screen device). The consumption event notifications can be associated with triggers contained in media assets that are consumed via the device A 510. Accordingly, in response to fulfillment of a trigger in a media asset (e.g., a linear program), the content consumption platform 530 can supply a second media asset and/or signaling in accordance with the fulfilled trigger.

In addition or in the alternative, the device B 540 can communicate information (e.g., data, metadata, and/or signaling) upstream to the content consumption platform 530, where the information may be directed to a third-party platform (e.g., third-party platform 130). The content consumption platform can receive at least a portion of such information and can route it to a destination server associated with the destination third-party platform. Accordingly, in one aspect, the device B 540 can leverage the application unit 140 to post information in social-media services of web-based forums, to response to marketing campaigns associated with content consumed via the device A 510, and/or to perform commercial transactions which may be associated with such content or content provided to the device B 540 in response to a trigger being satisfied.

Figure 6:
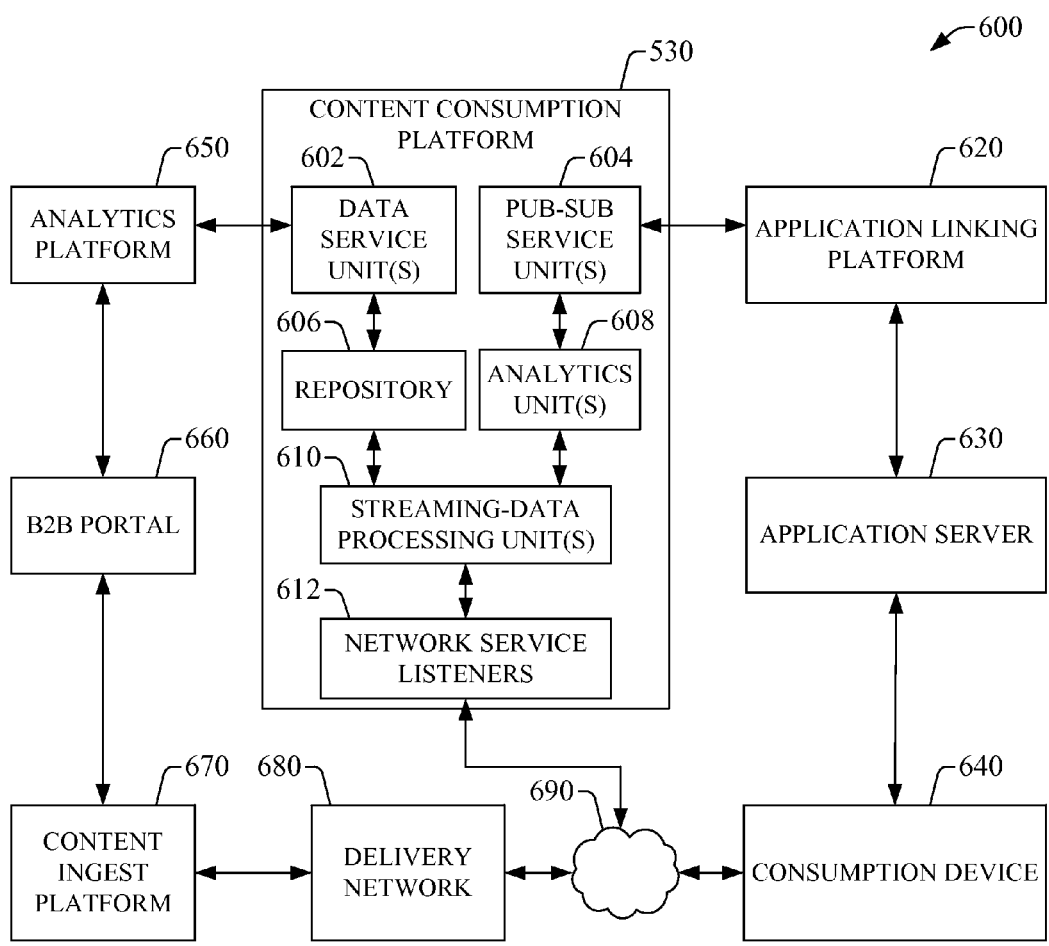

As illustrated in the example operational environment 600 shown in FIG. 6, in certain embodiments, the content consumption platform 530 can include various functional elements that permit distribution of content and/or generation of information associated with content consumption in accordance with one or more aspects of the disclosure. The content consumption platform 530 can include one or more data service units 602 that can acquire information (e.g., data, metadata, and signaling) indicative or otherwise representative of consumption of media assets. The data service unit(s) 602 can access or otherwise receive such information from a repository 606, which can include information structures, such as databases (relational or otherwise), containing consumption information indicative or otherwise representative of consumption of media assets. In one example, the consumption information can include one or more of information indicative of usage of an application module (e.g., application unit 140) in a mobile computing device and/or information indicative of viewership of one or more assets, such a conventional linear program or a thematic programming channel in accordance with the disclosure. At least a portion of the consumption information can be acquired or otherwise received by one or more component 612, referred to as network listener(s) 612, that can acquire network events (e.g., requests for a VOD asset, channel changes or requests for linear-programming assets, and the like) that can occur at a specific access network of a group of access network(s) 690, which can transport or otherwise exchange information between a delivery network 680 (e.g., content acquisition chain/hybrid coaxial fiber (CAA/HFC), CDN, or the like) that can supply on-demand assets (e.g., VOD assets), time-shifted assets, and/or linear-programming assets. At least one of the network service listeners 612 can aggregate a group of network events in order to generate or otherwise determine a consumption event. One or more of the network service listeners 612 can measure or otherwise collect signaling at one or more transport networks 690. In addition, the content consumption platform 530 can include one or more streaming-data processing unit(s) 610 that can analyze and/or identify network traffic and/or network queues and/or other signaling (such as network messaging for tuning to a specific channel, implementation of trick modes, media asset acquisition, a combination thereof, or the like). At least a portion of the consumption information can be retained in the repository 606.

As illustrated, the example operational environment includes a content ingest platform 670 that can permit a third-party platform (such as a business partner, and advertiser, a content producer, a combination thereof, or the like) to supply content, such as advertisement or other promotional content, informational media assets, entertainment media assets, a combination thereof, or the like. It should be appreciated that, in certain embodiments, the content ingest platform 670 and the content consumption platform 530 can form a content platform of the disclosure. In other embodiments, the content ingest 670, the delivery network 680, and the transport network 690 can embody or can constitute the content service platform 520.

Figure 8:
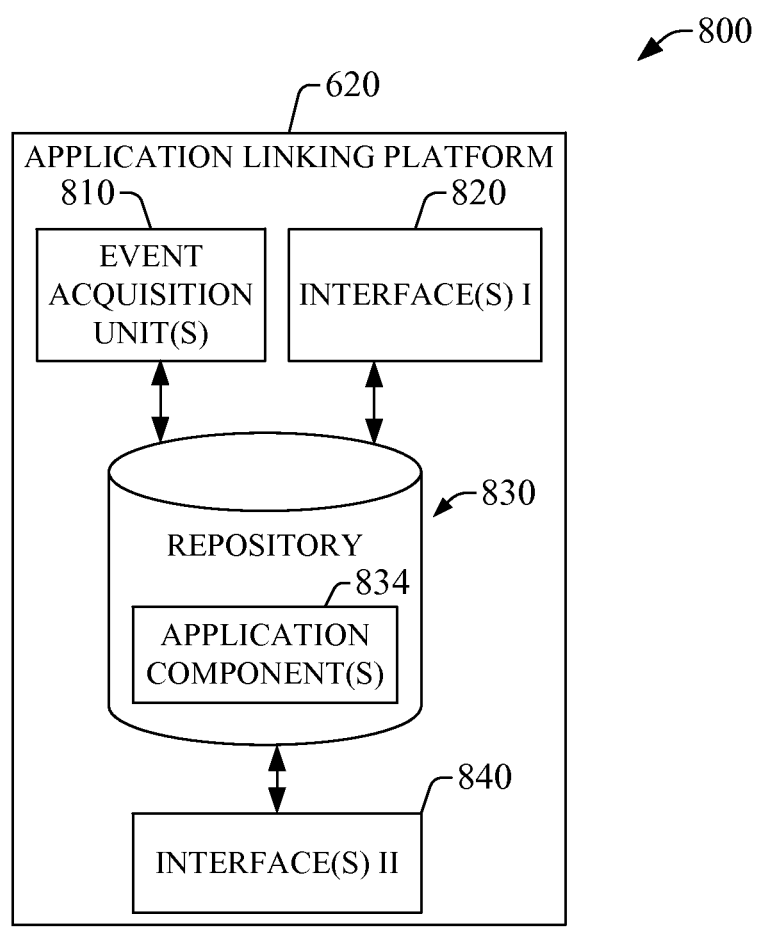

One or more analytics units 608 can receive at least a portion of the consumption information and can identify specific events, or actions, associated with consumption of media assets in a consumption device that includes an application unit (e.g., application unit 140). Event information indicative of one or more events can be provided to one or more publication-subscription ("pub-sub") service units 604 that can subscribe a consumption device (e.g., consumption device 640) to an event service that can provide information indicative or otherwise representative of an event to an application linking platform 620. As illustrated in FIG. 8, the application linking platform 620 can include one or more event acquisition units 810 that can collect or otherwise receive event information from the content consumption platform 520. In one aspect, the application linking platform 620 can include one or more application components 834 retained in a repository 830, where such component(s) can embody specific application logic. In response to a specific event, execution of at least one of the application component(s) 834 can provide specific information to an application server 630, which can determine the behavior of the application at the consumption device 640 in response to an event. One or more interfaces 840 (referred to as interface(s) II 840) can embody or can contain at least one API that can permit communication with a consumption device configured to consume content via an application unit 140.

In addition, as illustrated in the example operational environment 600, the data service unit(s) 602 can provide consumption information or other type of information indicative of network events to an analytics platform 650. In one aspect, the analytics platform 650 can process or otherwise analyze such information and, based at least on such analysis, can produce information indicative or otherwise representative of consumption behavior of media assets for a specific application (e.g., application unit 140), a specific subscriber, a specific device, a combination thereof, and the like.

Consumption behavior information can be communicated to a business-to-business (B2B) portal unit 660 (which also may be referred to as B2B portal 660), which can be accessed by a third-party platform or a component thereof. In one aspect, the B2B portal 660 can provide at least a portion of the received consumption behavior information to a specific third-party platform (e.g., associated with an advertiser platform) that can have one or more applications (or application units) provisioned and active. To at least such an end, the B2B portal 660 can present a dashboard presenting one or more performance metrics. Put more simply, yet not exclusively, the B2B portal 660 can embody or can constitute a platform for third-party platforms to use for reviewing and analyzing user profile data, data analytics reports, etc.

Figure 7:
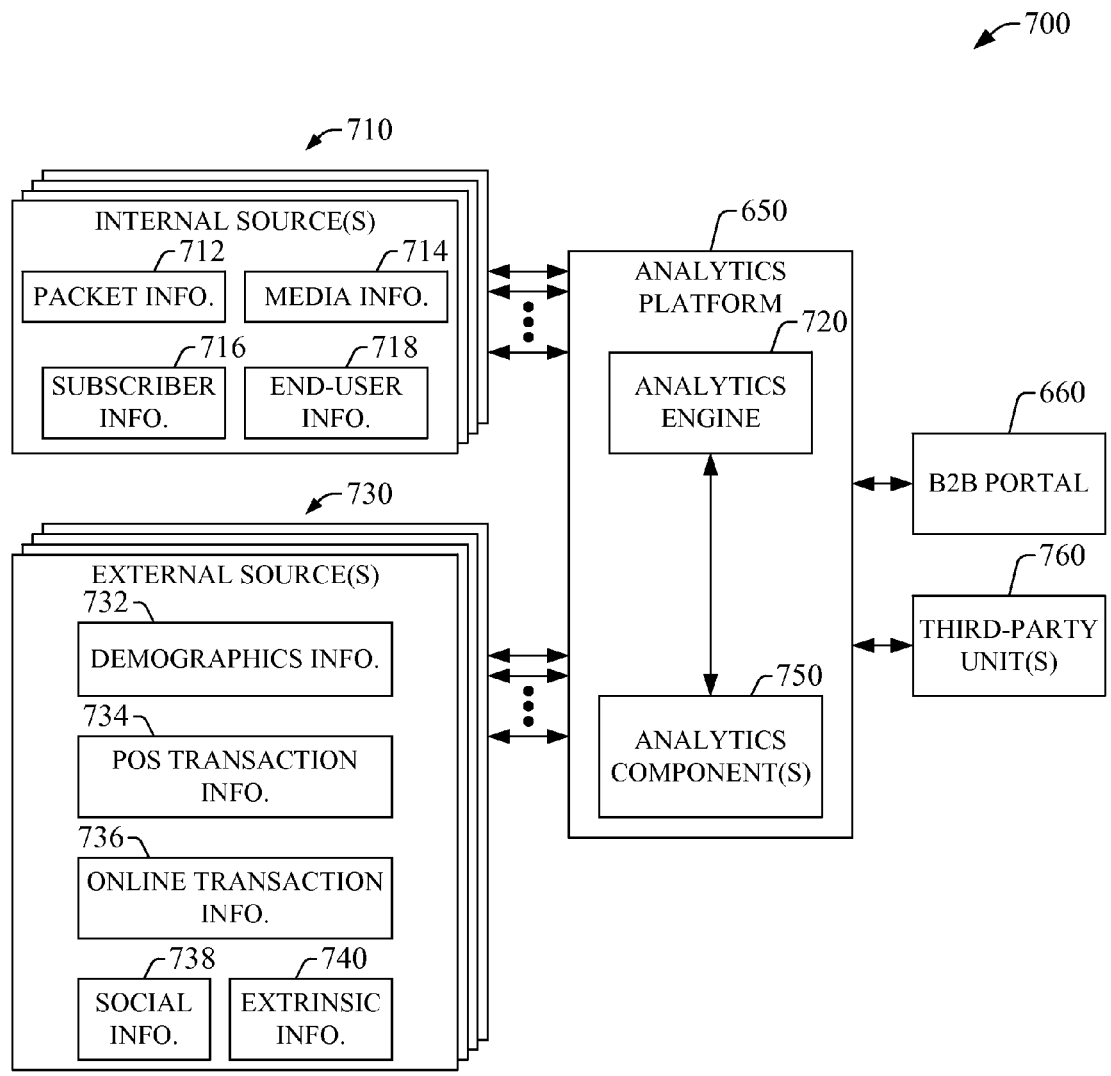

In certain embodiments, as illustrated in the example operational environment 700 shown in FIG. 7, the analytics platform 650 can include or can be embodied in an analytics engine 720. In one implementation, the analytics engine 720 can utilize or otherwise leverage one or more analytics components 750. In one example, the analytics component(s) 750 can embody numerous techniques for data analysis, aggregation, and/or feature extractions, including statistical mechanics formalisms and/or techniques, machine-learning formalisms and/or techniques, combinations thereof, or the like. In certain embodiments, at least one of the analytics component(s) 750 can be embodied in or can include computer-accessible instructions, and can be retained in one or memory devices, which may be referred to as a repository (not shown in FIG. 7). In addition, the analytics platform 650 can utilize or otherwise leverage consumption information (e.g., data and/or metadata) that can be internal to a service provider that can serve the consumption device 640. As such, in one aspect, the analytics platform 650 can receive at least a portion of the consumption information from one or more internal sources 710 (which may be referred to as internal source(s) 710) via a group of interfaces (not shown). As illustrated, the internal source(s) 710 can include one or more of the following: (i) a deep packet inspection (DPI) information source 712 (which may be referred to as packet information 712, and can be include a source of high-speed data (HSD) DPI, for example). For example, the information provided by the packet information source 712 can be indicative or otherwise representative of, for example, internet usage data at the uniform resource locator (URL) level for one or more CPE (e.g., router(s)). (ii) A media (e.g., video) usage information source 714, where at least a portion of such information is indicative or otherwise representative of usage at the set-top box level, for example. (iii) A subscriber information source 716, which can include detailed subscriber account and/or demographics information. (iv) An end-user information source, which can include information that can permit matching individual end-users to accounts, where the end-users can utilize an application (e.g., application unit 140) and/or a device (e.g., one of device(s) 110) in accordance with the disclosure.

In addition or in the alternative, the analytics platform 650 can utilize or otherwise leverage information (e.g., data and/or metadata) that can be external to the service provider that can serve the consumption device 640. The analytics platform 650 can include one or more external sources (which may be referred to as external source(s) 730). The external information source(s) 730 can include one or more of the following: (I) A demographics information source 732, which can include rich, granular geographic, demographic, and/or socioeconomic information associated or otherwise related to a specific segment or group of individuals. (II) Point-of-sale (which can be embodied in one of the device(s) 110) transaction information source 734, which can include information indicative or otherwise representative of in-person transactions (e.g., purchase) history for shoppers of a predetermined region. (III) Online or web-based transactions (e.g., purchase) information source 736, which can include information indicative or otherwise representative of online purchases and/or browsing history from across one or more websites (affiliated either with a single merchant or with multiple merchants). In one example, one or more of such websites may be identified via a URL of such websites. (IV) A social information source 738, which can include first-life (e.g., user) profile information and/or second-life (e.g., virtual representation of a user) profile information. (V) Other source(s) 740 of extrinsic information. In one example, such sources can include a source of weather information, a source of financial market information, a source of transactional information, a source of social networking information, combinations thereof, or the like.

In one aspect, the data analytics capabilities of the analytics platform 650 can permit third-party platforms (e.g., advertiser platforms, content generation platform, etc.) to develop a profound, rich understanding of their customers and target marketing efforts based at least on one or more of enhanced demographics, purchasing patterns, content affinities, social networking status, combination thereof, or the like, which can be gleaned from the consumption information that may be collected or otherwise acquired at the content consumption platform 530. For example, an end-user (e.g., a subscriber or consumer of a service) can be associated with an aggregated user profile (or subscriber profile) that can include, for example, annual income, age, favourite beverages, preferred television shows and/or pay-per-view shows, preferred websites, presence in a social network, hobbies, preferred brands, combinations thereof, or the like. Such a rich understanding of consumers and/or subscriber consumption behaviour can permit curation or otherwise selection of media assets and/or products associated therewith that may be of interest to a consumer or subscriber. As such, in one aspect, the analytics engine 720 can embody or can constitute a recommendation engine in accordance with this disclosure.

In another aspect, a third-party (e.g., a B2B partner of the service provider that can serve content to the consumption device 640) can have access to a B2B partner application (which can embody or can constitute the application unit 140) and/or website that can include or otherwise utilize an API or other interface to authenticate or validate a subscriber of the service provider. In addition, the B2B partner application and/or website can provide additional information (e.g., data and/or metadata) acquired by such application or website. In the example operational environment 700, the B2B partner application and the B2B website can be embodied or contained in the third-party unit(s) 760.

Figure 9:
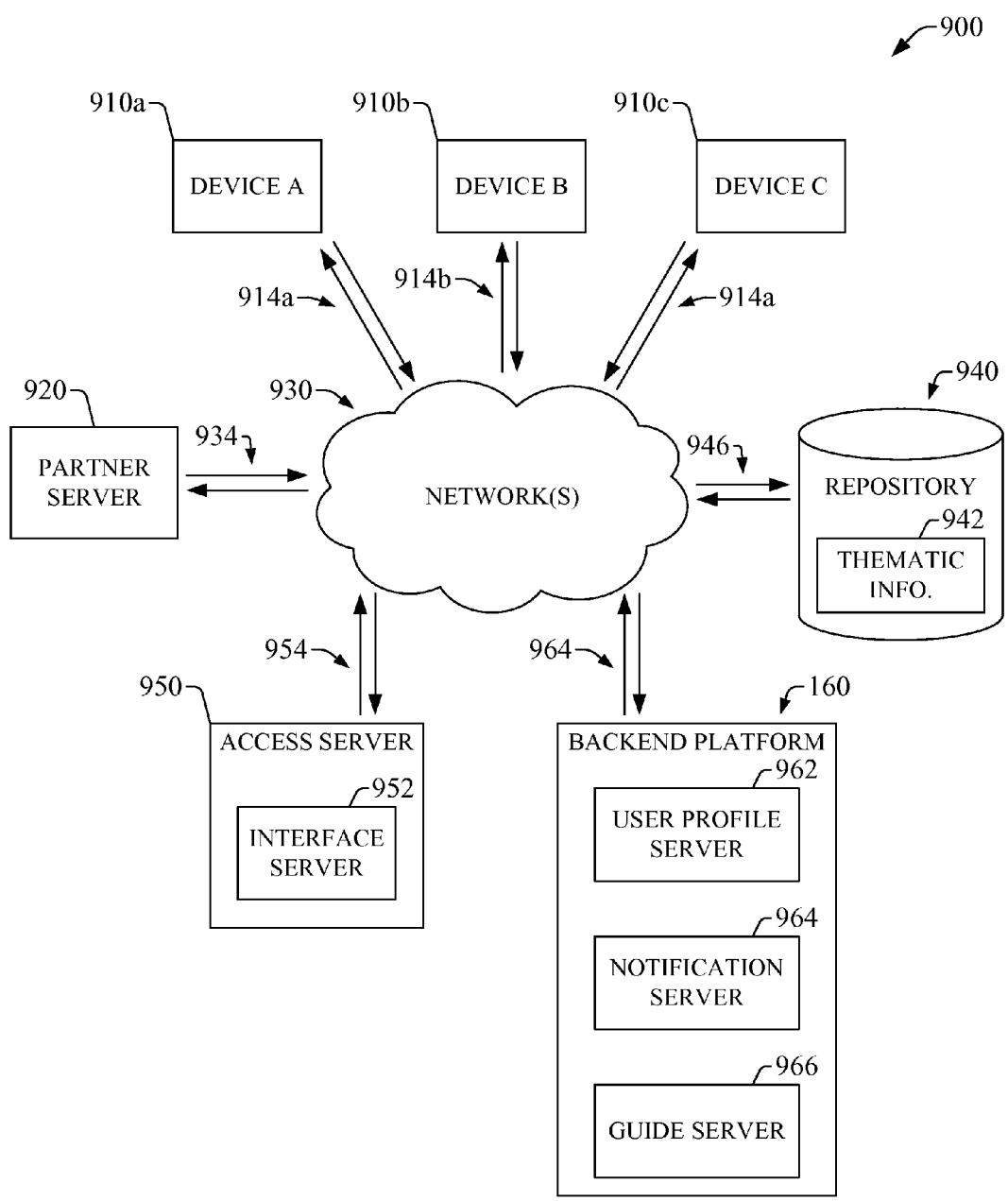
FIG. 9 presents an example of an operational environment in accordance with one or more aspects of the disclosure.

FIG. 9 presents an example of an operational environment 900 that can permit configuration of a thematic channel in accordance with one or more aspects of the disclosure. The thematic programming channel can include thematic information (e.g., a specific topic a subscriber is interested in consuming) that is representative or otherwise indicative of thematic content, and/or control information representative or otherwise indicative of metadata and/or signaling that can permit management of the thematic content. The thematic information can refer to a specific topic (such as cooking shows or, more generally, culinary art) that a subscriber of a content distribution service is interested in consuming. In addition, the control information can include channel guide information, media asset identifier(s), scheduling objects (e.g., information structures indicative of a specific scheduling of a media asset), combinations thereof, or the like. The thematic channel can be configured and/or consumed (e.g., rendered and/or managed) via one or more of device A 910a, device B 910b, or device C 910c. In certain embodiments, the device A 910a and the device B 910b can embody or can be included in the device(s) 110, and the device C 910c can embody or can include the application unit 140. In other embodiments, the devices 910a-910c can embody or can be included in the device(s) 110. The devices 910a-910c can be associated with a subscriber to a content delivery service provided by an organization that administers at least the backend platform 160. As an illustration, the device A 910a can be embodied in a tethered computing device (e.g., a desktop computer); the device B 910b can be a set-top computing device (also referred to as a set-top box) functionally coupled to a terminal display device; and the device C 910c can be a mobile computing device (such as tablet computer).

In one example implementation of thematic channel configuration, the device A 910a can access information indicative of thematic content via a partner server 920, which can be a server included in the third-party platform 130. As illustrated, the thematic content can be retained in one or more memory elements 942 (referred to as thematic content 942) within one or more memory devices 940 (referred to as repository 940). In one aspect, the thematic content can be provided (e.g., generated, updated, and/or delivered) by one or more of (i) the third-party platform associated with the partner server 920 or (ii) the backend platform 160 or a functional element thereof. In one aspect, the partner server 920 can be embodied in or can include a server that can receive information (e.g., signaling) indicative of a request or query to supply thematic information, including at least a portion of the thematic content 942. The device A 910a can communicate the request or query via an interface, such as an graphical user interface (GUI) rendered in a display device included in the device A 910a. For example, the GUI can include indicia (e.g., a visual representation of a link) that, in response to actuation, can direct or otherwise cause the device A 910a to communicate (e.g., transmit) the request or query for thematic information to the partner server 920. In certain implementations, such a GUI can be a web-based graphical interface, and the partner server 920 can be embodied in or can include a web server, such as a hypertext transfer protocol (HTTP) server. In such implementations, the information indicative of the request or query can be formatted and/or communicated according to web-based communication protocol, such as HTTP or the like. In response to the query or request, the partner server 920 can access at least a portion of the thematic content 942, and can communicate information representative or otherwise indicative of at least the portion of the accessed thematic content to the device A 910a. To at least such an end, the partner server 920 can utilize or otherwise leverage at least one network of the network(s) 930 to access the repository 940 and to convey the information indicative or otherwise representative of the thematic content.

In addition, based at least on thematic information indicative or otherwise representative of thematic content, the device A 910a can access selection information indicative of a group of media assets—e.g., one or more of linear media assets, one or more of time-shifted media assets, one or more on-demand media assets, a combination thereof, or the like—associated with the thematic content. To at least such an end, in one aspect, the device A 910a can receive at least a portion of the selection information via an interface, e.g., a GUI rendered at a display device integrated into or functionally coupled to the device A 910a. The device A 910a can communicate at least a portion of the selection information to the partner server 920, which can relay such information to an access server 950. In addition, the device A 910a can communicate subscriber information indicative or otherwise representative of a subscriber of a content distribution service to the partner server 920. The content service can be provided by the organization that administers (e.g., configures, deploys, accepts, and/or manages or otherwise maintains) the access server 950 and/or the backend platform 160.

The partner server 920 can communicate the subscriber information and/or at least the portion of the selection information received from the device A 910a to an access server 950 via a network of the network(s) 930. As illustrated, the partner server 920 and the access server 950 can be functionally coupled to such a network via links 934 and links 954, respectively. In one implementation, the access server 950 can include an interface server 952 (e.g., an application programming interface (API) server) that can receive at least the portion of the selection information. The access server 950 can communicate the subscriber information and/or at least the portion of the selection information to the backend platform 160 via a second network of the network(s) 930. The second network can embody or can constitute the communication platform 164. As illustrated, in the operational environment 900, the access server 950 can communicate (e.g., transmit) the subscriber information and/or at least the portion of the selection information to a user profile server 962 included in the backend platform 160.

In another aspect of configuration of a thematic programming channel, the user profile server 962 can utilize or otherwise leverage the subscriber information and/or the selection information received from the access server 950 as described herein in order to generate the thematic channel. The selection information can identify (e.g., can represent or can be indicative of) a group of media assets selected for inclusion in the thematic channel. In one aspect, based at least on the selection information, the user profile server 962 can access thematic information associated the group of media assets, and can select or otherwise identify such a group of assets within the backend platform 160. It should be appreciated that, in one aspect, such a selection can be a logic selection in which a media asset of the group of media assets can be tagged or otherwise characterized as an asset that pertains to the thematic channel. For instance, the selection information can convey that media assets associated with competitive cooking programs (e.g., Chopped, Sweet Genius, and the like) are to be included in the thematic channel. Accordingly, in one aspect, the user profile server 962 can select such media assets for configuration of the thematic channel. In response to (e.g., upon or after) selection of media assets, the user profile server 962 can generate the thematic programming channel. In addition, the user profile server 962 can configure access rights to the thematic programming channel by a computing device (e.g., device B 910b or device C 910c, or both) associated with the subscriber identified by the subscriber information. The access rights include control access to view channel listings including the thematic programming channel, preview media assets (e.g., pay-per-view media assets), and/or playback a media asset, and can be retained in a user profile associated with the subscriber for which the thematic programming channel is generated. In one aspect, configuration of the access rights can include configuration of a subscriber profile associated with a subscriber to the content delivery service that can provide content (e.g., thematic programming assets). In one example, as described herein, the subscriber information can include analytics information including one or more of demographics data; user profile data; content consumption information; content affinities; purchasing patterns; social networking data; information about the user device; network connectivity (such as availability status of a HFC, a PON, a WiFi network or other small-cell network, amount of bandwidth used for communication, contention, and the like); any errors or exceptions experienced; combinations thereof or the like.

It can be readily apparent that configuration of a thematic programming channel affords a substantial degree of customization of content that an client device can consume. In addition, it should be appreciated that a thematic programming channel can be augmented with interaction assets, including (i) control assets (e.g., parental control features; scheduling assets, such as custom playback commands, trick play commands, custom trick play commands; combination thereof; or the like; and/or (ii) interactions assets, such as targeted interactive advertisement (e.g., advertisement in which feedback from a recipient can customize the advertisement or provide specific offers or incentives); marketing surveys; combinations thereof; or the like. In certain implementations, an interaction asset associated with a thematic programming channel can be consumed by a second-screed device (e.g., device C 910*c*).

Figure 10:
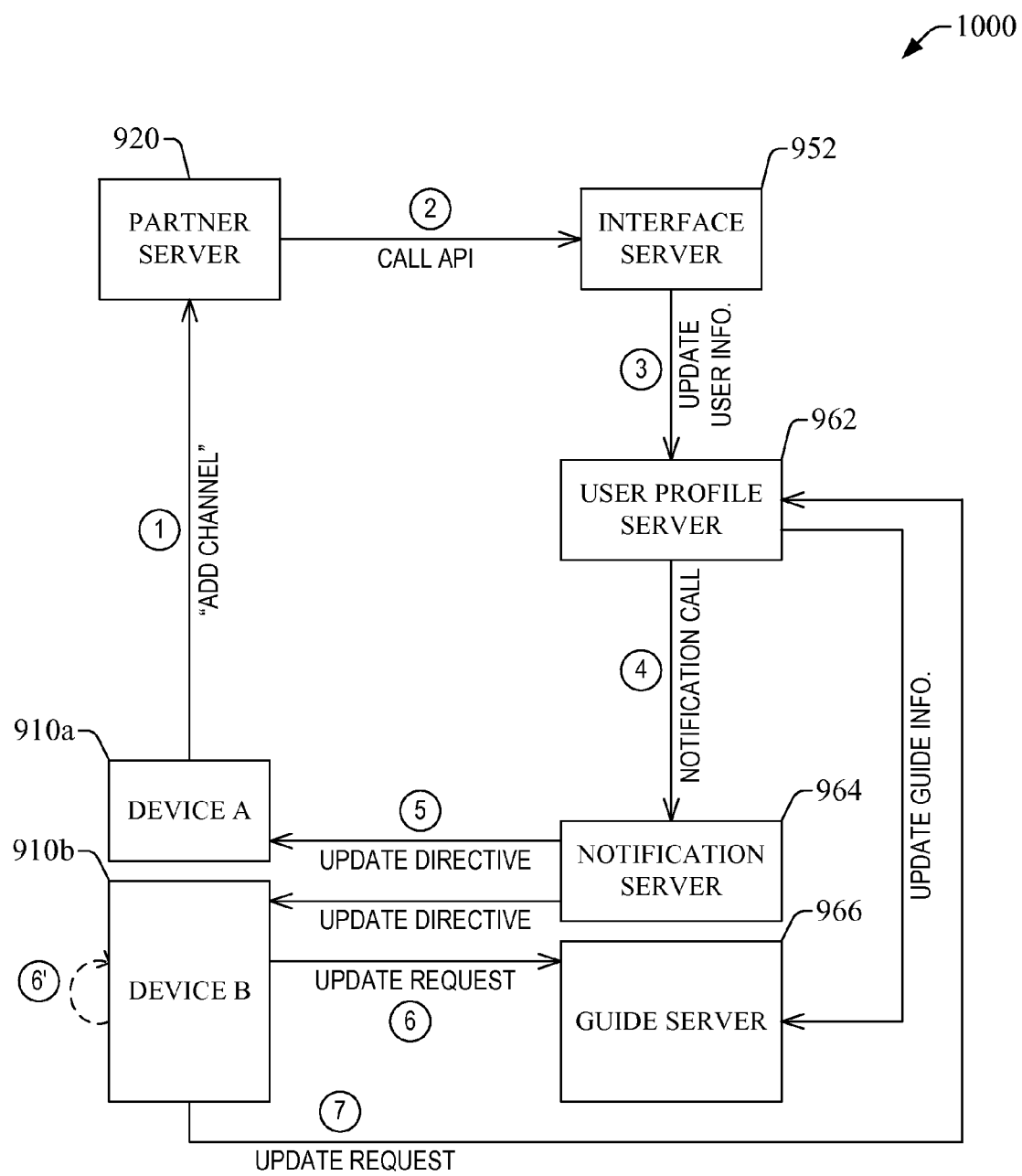
FIG. 10 presents an example of information flow and operations in accordance with one or more aspects of the disclosure.

In addition to generation of a thematic programming channel, guide information indicative or otherwise representative of the thematic programming channel can be configured. To at least such an end, certain information associated with the thematic programming channel can be communicated across various functional elements of the illustrative operational environment 900. As an illustration, FIG. 9 presents an example of information flow and operations for configuration of guide information (also referred to as "channel guide") in accordance with the operational environment 900. Although the illustrated flow of information occurs according to a specific order (represented by circles having Arabic numerals), such a flow can occur according to other order. As illustrated, the device A 910*a* can communicate control information (e.g., signaling) indicative of addition of channel (e.g., a thematic programming channel) to the partner server 920, which can supply subscriber information (data and/or metadata that identifies a subscriber) and at least a portion of the control information to the interface server 952. As described herein, the device A 910*a* can receive the control information via an interface at the device A 910*a*. As illustrated, the partner server 920 can convey such information via an application programming interface (API) call to the interface server 952. In the illustrated implementation, the interface server 952 (e.g., an API server) can communicate the subscriber information and the control information to the user profile server 962. In response, the user profile server 962 can update (e.g., generate anew or revise) a subscriber profile associated with the subscriber identified by the subscriber information. In addition or in the alternative, the user profile server 962 can generate analytics information associated with behavior of the subscriber related to addition of channels (e.g., thematic programming channels or predefined channels), viewership data, viewership metadata, combinations thereof, or the like. As illustrated, the user profile server 962 can communicate updated information (e.g., signaling) indicative or otherwise representative of the update to the subscriber profile—e.g., generation of the subscriber profile or revision of the subscriber profile—to the notification server 964. As illustrated, in one aspect, the update information can be conveyed as a notification call to the notification server 964. In response, the notification server 964 can convey notification information (e.g., update directive) the directs or otherwise conveys to the device A 910*a*, the device B 910*b*, and/or the device C 910*c* (not shown in FIG. 10) to obtain updated information (e.g., subscriber profile, channel map, programming information, and the like) that is available at the backend platform 160. As illustrated, in response to the notification information, the device B 910*b* can request updated guide information from the guide server 966, or can receive the updated guide information asynchronously (which can be referred to as "wait for guide information"). In response to receiving updated guide information, the device B 910*b* can convey (e.g., render) a channel guide having the channel that is added, such as a thematic programming channel. In addition, for example, the device B 910*b* can request other updated information, such as updated user profile, updated channel map, and the like.

Figure 11:
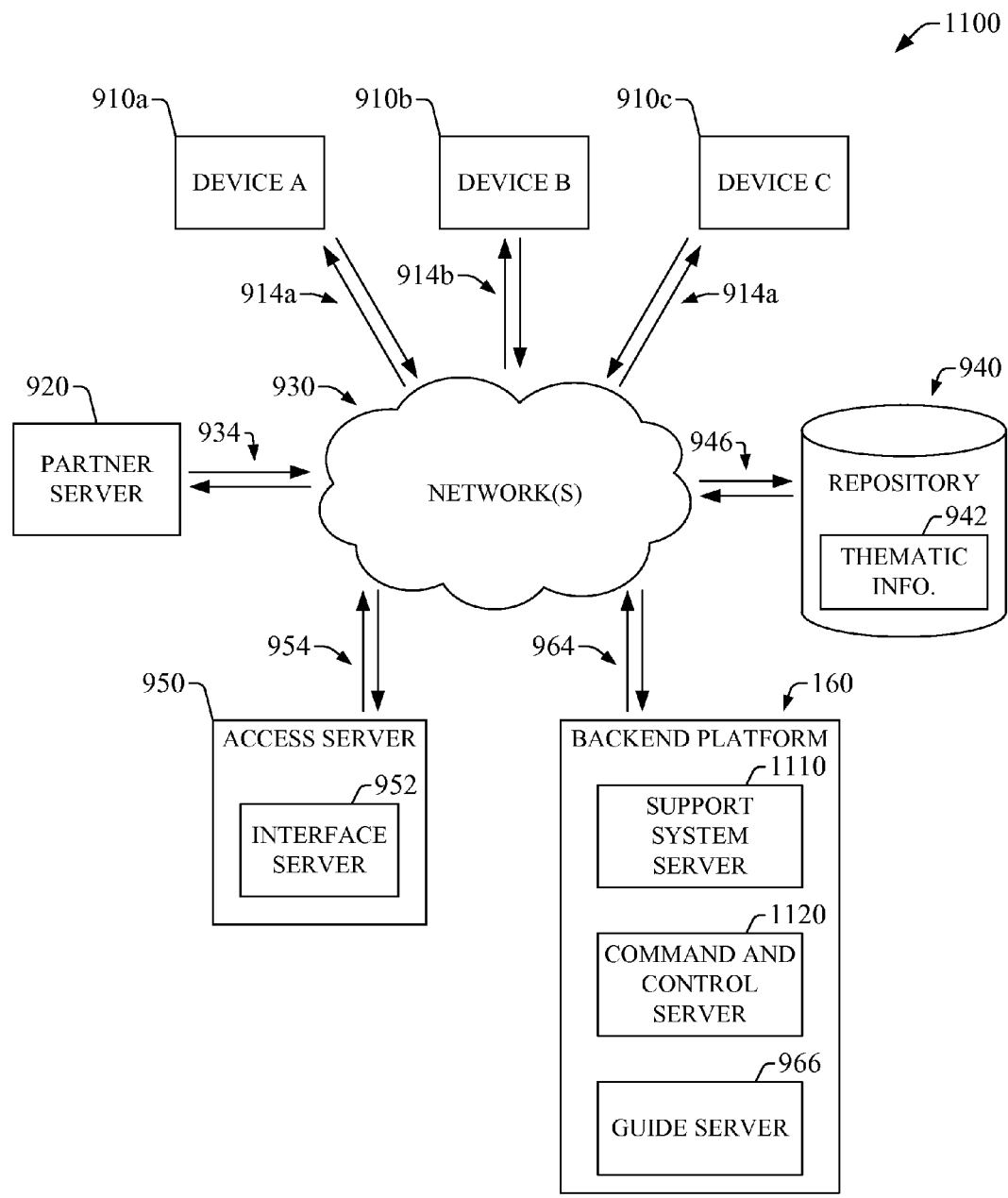
FIG. 11 presents an example of another operational environment in accordance with one or more aspects of the disclosure.
Figure 12:
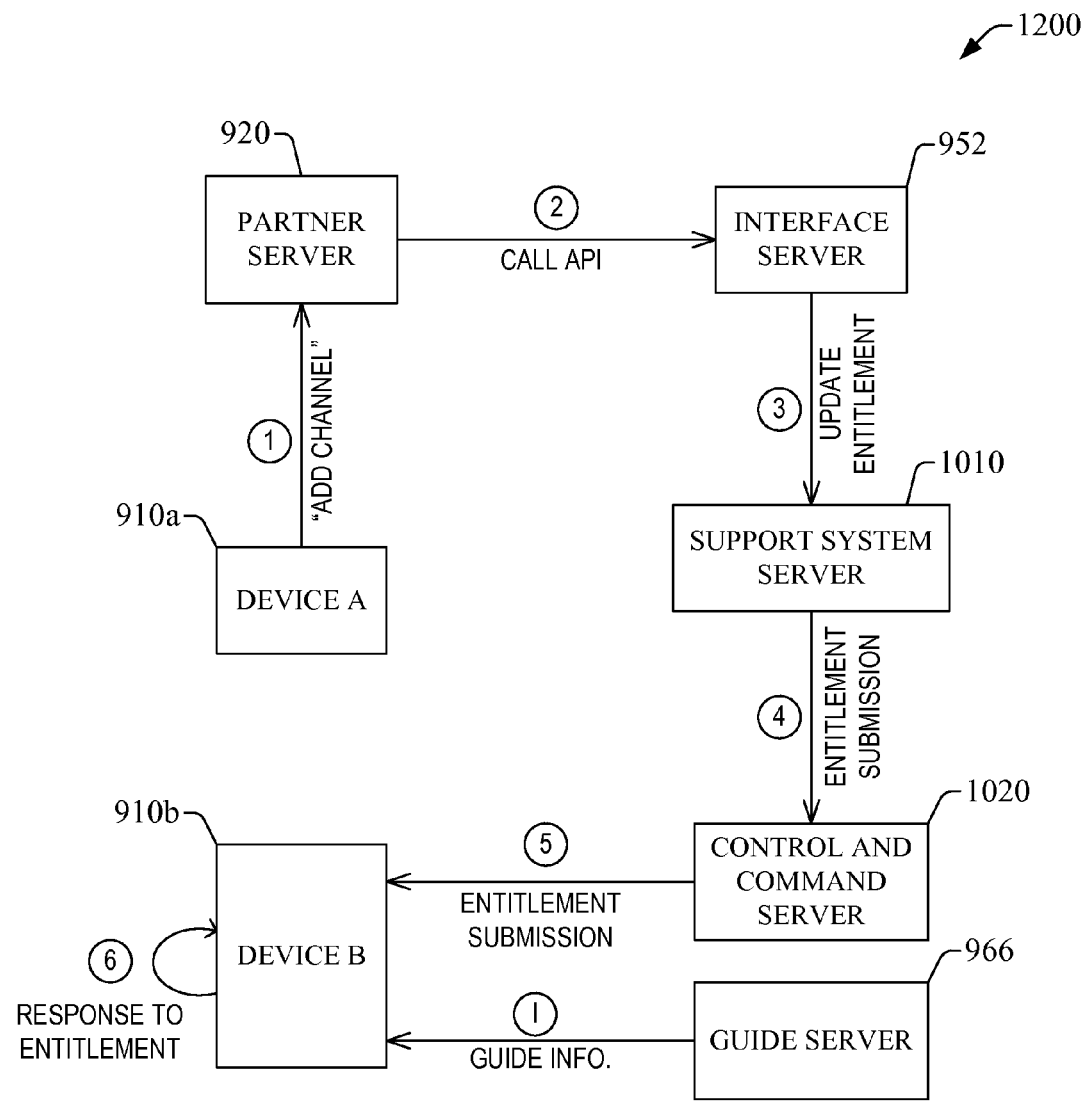
FIG. 12 presents an example of information flow and operations in accordance with one or more aspects of the disclosure.

FIG. 11 presents another example of an operational environment 1100 that can permit configuration of a thematic programming channel and guide information in accordance with one or more aspects of the disclosure. As illustrated, the operational environment 1100 includes a support system server 1110 that permits configuration of the thematic programming channel in a similar manner as described herein in connection with the user profile server 962. Regarding configuration of a channel guide, FIG. 12 presents an example of information flow and operations for configuration of guide information (also referred to as "channel guide") in accordance with the illustrative operational environment 1100. In certain embodiments, the device B 910*b* in the operational environment 1100 can be embodied in a legacy client device (e.g., a downstream set-top-box). Accordingly, as illustrated, after the interface server 952 conveys update information (e.g., signaling) to a support system server 1110 (e.g., a B/OSS server, such as a billing server or a provisioning server) to update entitlement information associated with a subscriber profile including the device B 910*b* as a device that can consume content from the backend platform 160. It should be appreciated that, in one aspect, the interface server 952, in response to the API call to add a channel, can generate an entitlement configuration for a device associated with the subscriber identified in the information conveyed in the API call. Such entitlement information can be included in the updated information. As illustrated, the update information can include entitlement information that is specific to the channel that is added (e.g., a thematic programming channel or a predefined channel). In response, the support system server 1110 can convey at least the entitlement information to a control and command server 1120 (e.g., an out-of-band control and command server), which can relay at least the entitlement information to the device B 910*b*. In addition, the guide server 966 can convey guide information 966 that can be updated (not represented in FIG. 12) in response to the support system server receiving the update information from the interface server 952.

Figure 13:
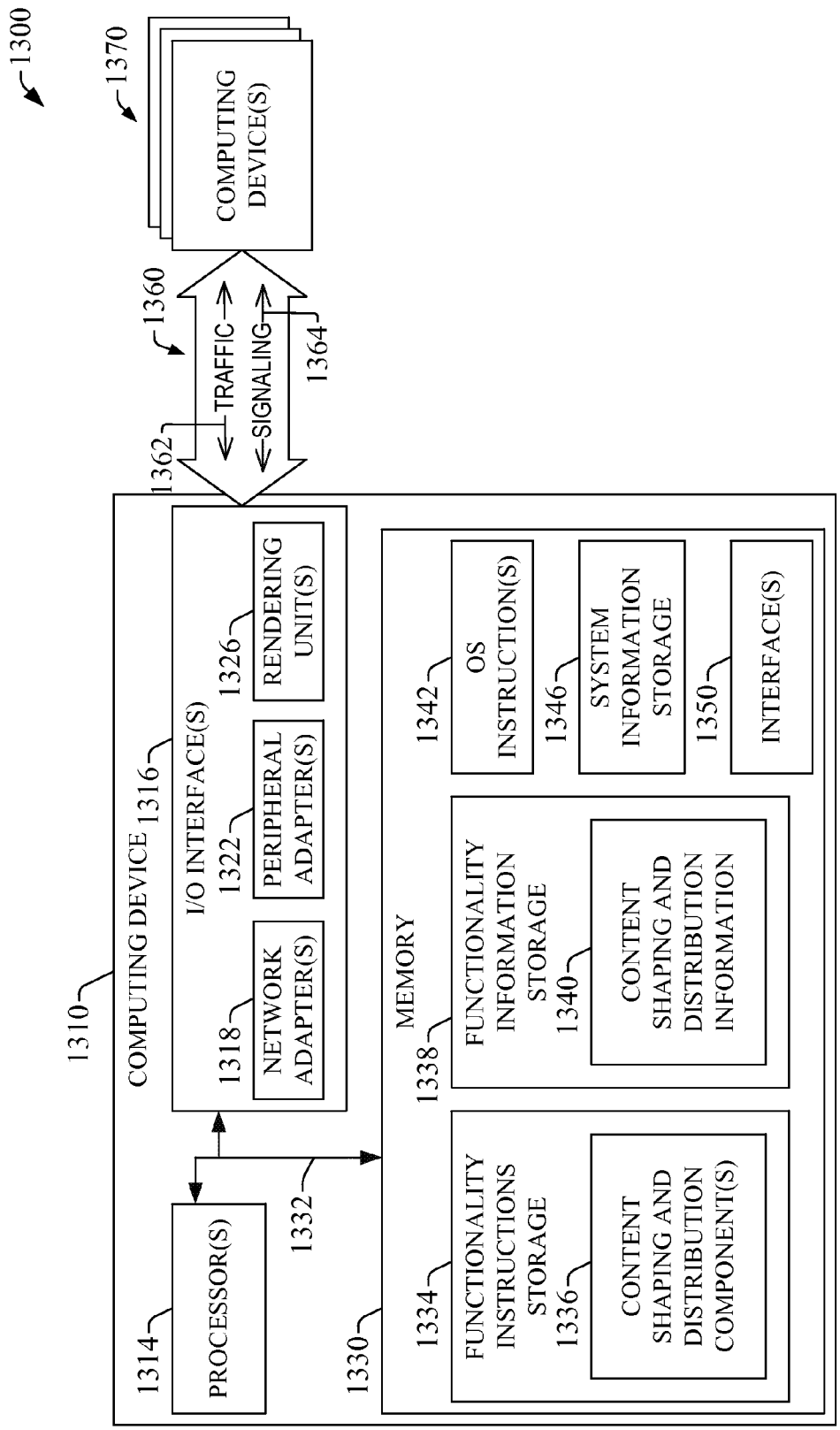
FIG. 13 presents an example of a computational environment in accordance with at least certain aspects of the disclosure.

FIG. 13 presents a block diagram of an example computational environment 1300 for shaping and distribution of content, and/or consumption thereof in accordance with one or more aspects of the disclosure. These example operational environments are only illustrative and are not intended to suggest or otherwise convey any limitation as to the scope of use or functionality of the operating environments' architecture. In addition, the operational environments should not be interpreted as having any dependency or requirement relating to any one or combination of components illustrated in these example operational environments.

The operational environment 1300 represents an example software implementation of the various aspects or features of the disclosure in which the processing or execution of operations described in connection with configuration and distribution of content can be performed in response to execution of one or more software components at the computing device 1310. It should be appreciated that the one or more software components can render the computing device 1310, or any other computing device that contains such components, a particular machine for configuration and distribution of content in accordance with features described herein, among other functional purposes. A software component can be embodied in or can comprise one or more computer-accessible instructions, e.g., computer-readable and/or computer-executable instructions. In one scenario, at least a portion of the computer-accessible instructions can embody one or more of the example methods presented in FIGS. 14-21 and various processes described in this disclosure. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can assembled into one or more program modules, for example, that can be compiled, linked, and/or executed at the computing device 1310 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1310 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with configuration and distribution of content can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

The computing device 1310 can embody or can constitute any of the devices (e.g., a device of device(s) 110), platforms, units, servers, engines, or the like, described herein and that operate in accordance with this disclosure, including devices referred to as first-screen devices, second-screen devices, consumption devices, platforms, engines, servers, or the like. As illustrated, the computing device 1310 can comprise one or more processors 1314, one or more input/output (I/O) interfaces 1316, a memory 1330, and a bus architecture 1332 (also termed bus 1332) that functionally couples various functional elements of the computing device 1310. In certain embodiments, the computing device 1310 can include a radio unit (not depicted in FIG. 13). In one of such embodiments, the computing device 1310 can embody or constitute a mobile device with wireless communication functionality and that can operate in accordance with aspects of this disclosure. For example, the mobile device can embody or can constitute the device B 540 described herein. The radio unit can include one or more antennas and a communication processing unit that can permit wireless communication between the computing device 1310 and another device, such as one of the computing device(s) 1370. At least one of the computing device(s) 1370 can have similar or identical architecture to the computing device 1310. The bus 1332 can include at least one of a system bus, a memory bus, an address bus, or a message bus, and can permit exchange of information (data, metadata, and/or signaling) between the processor(s) 1314, the I/O interface(s) 1316, and/or the memory 1330, or respective functional element therein. In certain scenarios, the bus 1332 in conjunction with one or more internal programming interfaces 1350 (also referred to as interface(s) 1350) can permit such exchange of information. In scenarios in which processor(s) 1314 include multiple processors, the computing device 1310 can utilize parallel computing.

The I/O interface(s) 1316 permit communication of information between the computing device and an external device, such as another computing device, e.g., a network element or an end-user device. Such communication can include direct communication or indirect communication, such as exchange of information between the computing device 1310 and the external device via a network or elements thereof. As illustrated, the I/O interface(s) 1316 can comprise one or more of network adapter(s) 1318, peripheral adapter(s) 1322, and rendering unit(s) 1326. Such adapter(s) can permit or facilitate connectivity between the external device and one or more of the processor(s) 1314 or the memory 1330. In one aspect, at least one of the network adapter(s) 1318 can couple functionally the computing device 1310 to one or more computing devices 1370 via one or more traffic and signaling pipes 1360 that can permit or facilitate exchange of traffic 1362 and signaling 1364 between the computing device 1310 and the one or more computing devices 1370. Such network coupling provided at least in part by the at least one of the network adapter(s) 1318 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each of the computing device(s) 1370 can have substantially the same architecture as the computing device 1310. In addition or in the alternative, the rendering unit(s) 1326 can include functional elements (e.g., lights, such as light-emitting diodes; a display, such as liquid crystal display (LCD), combinations thereof, or the like) that can permit control of the operation of the computing device 1310, or can permit conveying or revealing operational conditions of the computing device 1310.

In one aspect, the bus 1332 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB), and the like. The bus 1332, and all buses described herein can be implemented over a wired or wireless network connection and each of the subsystems, including the processor(s) 1314, the memory 1330 and memory elements therein, and the I/O interface(s) 1316 can be contained within one or more remote computing devices 1370 at physically separate locations, connected through buses of this form, in effect implementing a fully distributed system. As it can be appreciated, a distributed system can include a functionally coupled system of one or more computing platforms including or otherwise formed by multiple computing devices, such as the computing device 1310 and the computing devices 1370.

The computing device 1310 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1310, and can comprise, for example, both volatile and non-volatile media, and removable and/or non-removable media. In one aspect, the memory 1330 can comprise computer-readable media in the form of volatile memory, such as random access memory (RAM), and/or non-volatile memory, such as read only memory (ROM).

The memory 1330 can comprise functionality instructions storage 1334 and functionality information storage 1338. The functionality instructions storage 1334 can comprise computer-accessible instructions that, in response to execution (by at least one of the processor(s) 1314), can implement one or more of the functionalities of the disclosure. The computer-accessible instructions can embody or can comprise one or more software components illustrated as content shaping and distribution component(s) 1336. In one scenario, execution of at least one component of the content shaping and distribution component(s) 1336 can implement one or more of the example methods 1400 through 2100. For instance, such execution can cause a processor that executes the at least one component to carry out a disclosed example method. It should be appreciated that, in one aspect, a processor of the processor(s) 1314 that executes at least one of the content shaping and distribution component 1336 can retrieve information from or retain information in a memory element 1340 in the functionality information storage 1338 in order to operate in accordance with the functionality programmed or otherwise configured by the content shaping and distribution component(s) 1336. Such information can include at least one of code instructions, information structures, or the like. At least one of the one or more interfaces 1350 (e.g., application programming interface(s)) can permit or facilitate communication of information between two or more components within the functionality instructions storage 1334. The information that is communicated by the at least one interface can result from implementation of one or more operations in a method of the disclosure. In certain embodiments, one or more of the functionality instructions storage 1334 and the functionality information storage 1338 can be embodied in or can comprise removable/non-removable, and/or volatile/non-volatile computer storage media. In certain embodiments, the functionality instructions storage 1334 can include components that can embody or can constitute an application or application unit as described herein. Execution of such components can provide at least some of the functionality in accordance with this disclosure. Similarly, in such embodiments, the functionality information storage 1338 can include information (e.g., data and/or metadata) that can be relied upon to provide the functionality of the application or application unit in accordance with aspects of the disclosure.

At least a portion of at least one of the content shaping and distribution component(s) 1336 or content shaping and distribution information 1340 can program or otherwise configure one or more of the processors 1314 to operate at least in accordance with the functionality described herein. It should be appreciated that, in certain scenarios, the functionality instruction(s) storage 1334 can embody or can comprise a computer-readable non-transitory storage medium having computer-accessible instructions that, in response to execution, cause at least one processor (e.g., one or more of processor(s) 1314) to perform a group of operations comprising the operations or blocks described in connection with the disclosed methods.

In addition, the memory 1330 can comprise computer-accessible instructions and information (e.g., data and/or metadata) that permit or facilitate operation and/or administration (e.g., upgrades, software installation, any other configuration, or the like) of the computing device 1310. Accordingly, as illustrated, the memory 1330 can comprise a memory element 1342 (labeled OS instruction(s) 1342) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 1310 can dictate a suitable OS. The memory 1330 also comprises a system information storage 1346 having data and/or metadata that permits or facilitate operation and/or administration of the computing device 1310. Elements of the OS instruction(s) 1342 and the system information storage 1346 can be accessible or can be operated on by at least one of the processor(s) 1314.

It should be recognized that while the functionality instructions storage 1334 and other executable program components, such as the operating system instruction(s) 1342, are illustrated herein as discrete blocks, such software components can reside at various times in different memory components of the computing device 1310, and can be executed by at least one of the processor(s) 1314. In certain scenarios, an implementation of the content shaping and distribution component(s) 1336 can be retained on or transmitted across some form of computer readable media.

The computing device 1310 and/or one of the computing device(s) 1370 can include a power supply (not shown), which can power up components or functional elements within such devices. The power supply can be a rechargeable power supply, e.g., a rechargeable battery, and it can include one or more transformers to achieve a power level suitable for operation of the computing device 1310 and/or one of the computing device(s) 1370, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 1318) to connect operationally to the conventional power grid. In another aspect, the power supply can include an energy conversion component, such as a solar panel, to provide additional or alternative power resources or autonomy for the computing device 1310 and/or one of the computing device(s) 1370.

The computing device 1310 can operate in a networked environment by utilizing connections to one or more remote computing devices 1370. As an illustration, a remote computing device can be a personal computer, a portable computer, a server, a router, a network computer, a peer device or other common network node, and so on. As described herein, connections (physical and/or logical) between the computing device 1310 and a computing device of the one or more remote computing devices 1370 can be made via one or more traffic and signaling pipes 1360, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

In view of the aspects described herein, examples of techniques for device pairing that can be implemented in accordance with the disclosure can be better appreciated with reference to the diagrams in FIGS. 14-21. For purposes of simplicity of explanation, the examples of the techniques disclosed herein are presented and described as a series of blocks (with each block representing an action or an operation in a method, for example). However, it is to be understood and appreciated that the disclosed techniques (e.g., process(es), procedure(s), method(s), and the like) are not limited by the order of blocks and associated actions or operations, as some blocks may occur in different orders and/or concurrently with other blocks from that are shown and described herein. For example, the various techniques of the disclosure can be alternatively represented as a series of interrelated states or events, such as in a state diagram. Furthermore, not all illustrated blocks, and associated action(s) or operation(s), may be required to implement a technique in accordance with one or more aspects of the disclosure. Further yet, two or more of the disclosed techniques can be implemented in combination with each other, to accomplish one or more features and/or advantages described herein.

It should be appreciated that the techniques of the disclosure can be retained on an article of manufacture, or computer-readable medium, to permit or facilitate transporting and transferring such methods to a computing device (e.g., a desktop computer; a mobile computer, such as a tablet, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed techniques, can be employed to execute code instructions retained in a memory, or any computer-readable or machine-readable medium, to implement the one or more methods. The code instructions can provide a computer-executable or machine-executable framework to implement the techniques described herein.

Figure 14:
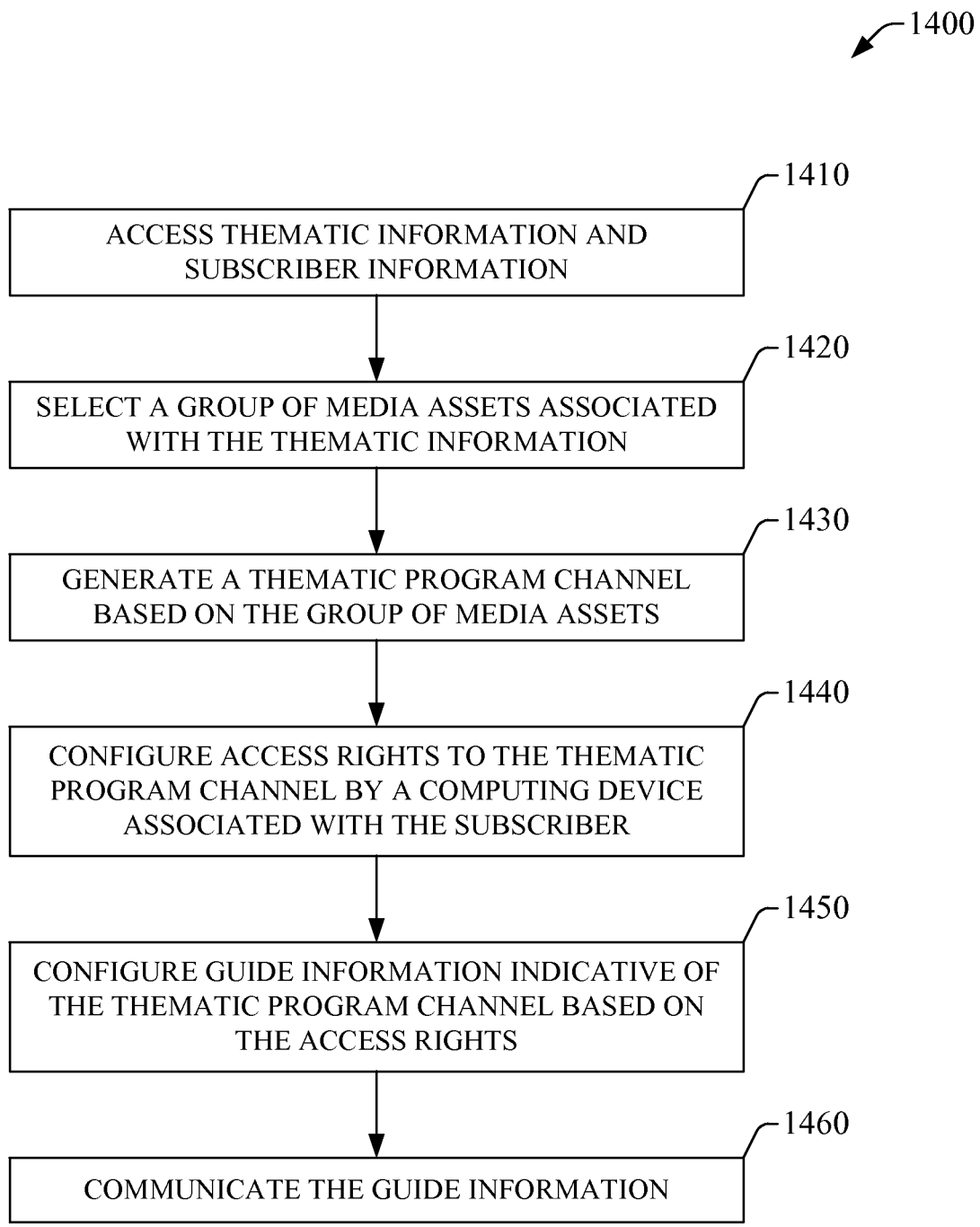
FIGS. 14-21 present examples of methods in accordance with one or more aspects of the disclosure.

FIG. 14 presents a flowchart of an example of a method 1400 for generating thematic channels according to at least certain aspects of the disclosure. In certain embodiments, a computing platform (e.g., example computing platform in FIG. 13) having one or more processors coupled (individually or in groups) with one or more memory devices can implement one or more blocks of the subject example method. At block 1410, thematic information and subscriber information can be accessed (e.g., received, collected, or the like). As described herein, the thematic information can be representative of thematic content, and the subscriber information can be indicative of a subscriber to a content delivery service. The thematic information can refer to a specific topic (such as cooking shows or, more generally, culinary art) that a subscriber of a content distribution service is interested in consuming. At block 1420, a group of media assets associated with the thematic information can be selected or otherwise identified. Selecting or otherwise identifying the group of media assets can include one or more of selecting at least one linear media asset, selecting an on-demand media asset, or selecting at least one time-shifted media asset. At block 1430, a thematic programming channel can be generated based at least on the group of media assets, where the thematic programming channel can convey at least one media asset of the group of media assets. Generating the thematic programming channel can include assigning a frequency channel to transmit the at least one media asset. At block 1440, access rights to the thematic programming channel can be configured. In the illustrated embodiment, a computing device associated with the subscriber can configure at least a portion of the access rights. The computing device can be embodied in or can comprise customer premises equipment or a wireless computing device. In one aspect, the access rights can be configured based on the subscriber information and the thematic information. In addition or in the alternative, the access rights can include access rights to the at least one media asset by the computing device, and wherein the computing device is one of customer premises equipment or a wireless computing device. At block 1450, guide information indicative of the thematic programming channel can be configured based on the access rights. At block 1470, the guide information can be communicated.

Figure 15:
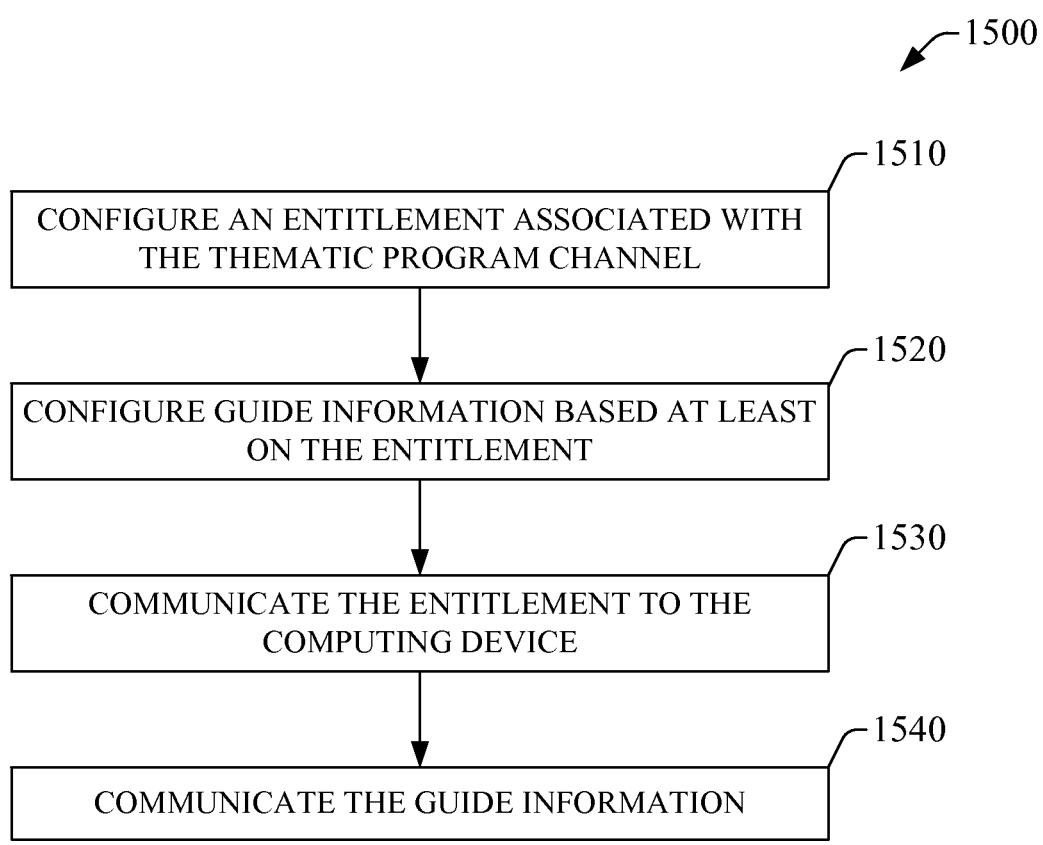
Figure 16:
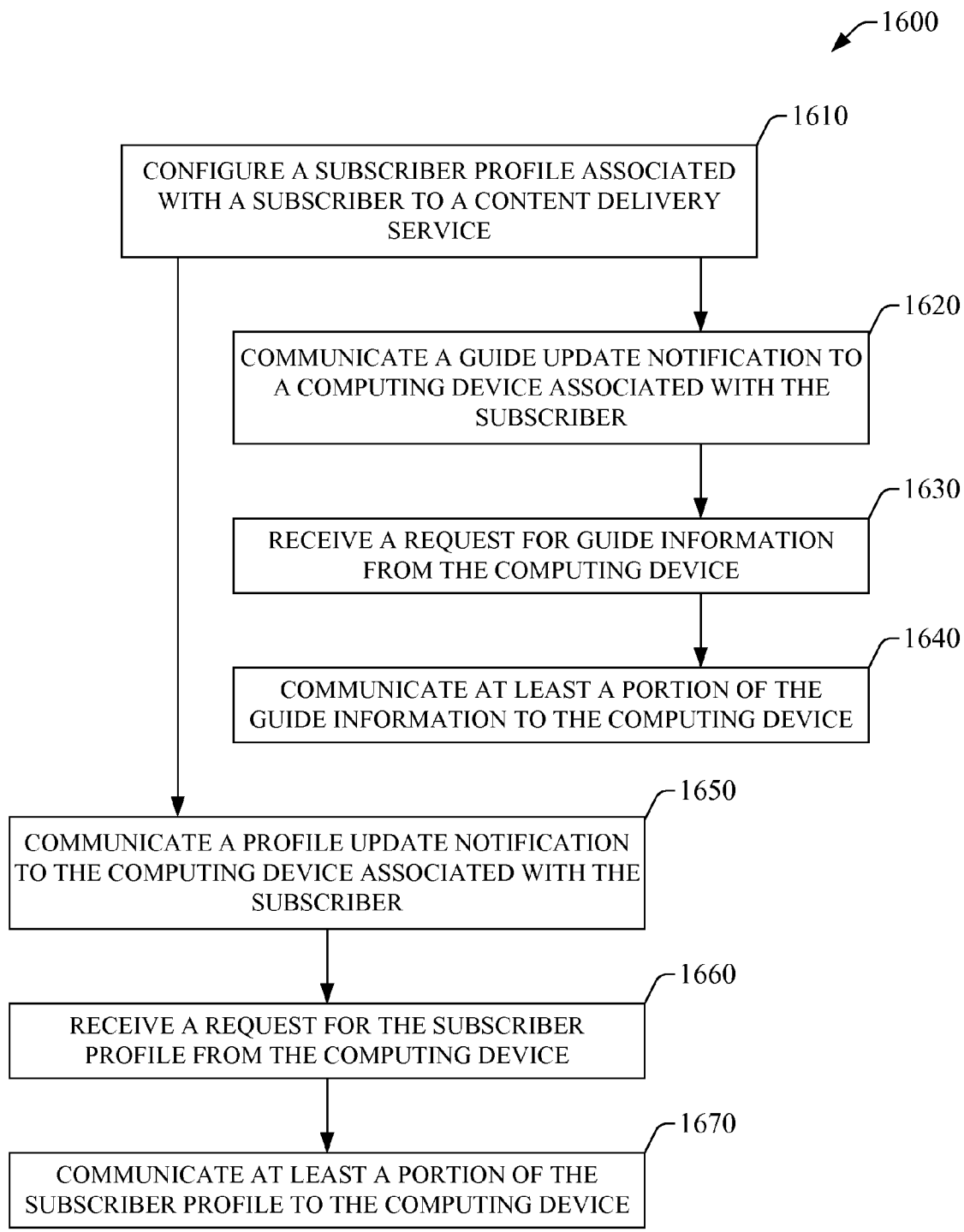

The configuration blocks 1340 and 1350 can be implemented in accordance with the operational environment in which the guide information is provided to a computing device. FIGS. 15 and 16 present examples of methods for configuration of guide information for two operational environments. Regarding example method 1500, at block 1510, an entitlement associated with the thematic channel is configured. At block 1520, guide information can be configured based at least on the entitlement. At block 1530, the entitlement can be communicated to the computing device (e.g. device 910*b*). At block 1540, the guide information can be communicated to the computing device.

Regarding method 1600, at block 1610, a subscriber profile associated with a subscriber to a content delivery service can be configured. As described herein, the configured subscriber profile can include information indicative of a program channel (e.g., a thematic programming channel). In one aspect, the user profile server 962 can configure the subscriber profile. At block 1620, a guide information update notification can be communicated to a computing device associated with the subscriber (e.g., device A 910*a*, device B 910*b*, or device C 910*c*). At block 1630, a request for guide information can be received from the computing device. At block 1640, at least a portion of the guide information can be communicated to the computing device. In addition, either substantially concurrently or in sequence after implementation of blocks 1620-1640, the example method 1600 can include block 1650, at which a profile update notification can be communicated to the computing device associated with the subscriber. In one aspect, the notification server 964 can communicate such a notification. At block 1660, a request for the subscriber profile can be received from the computing device in response to the profile update notification. At block 1670, at least a portion of the subscriber profile can be communicated to the computing device. In one aspect, the user profile server 962 can communicate the subscriber profile to the computing device via one or more networks (e.g., at least one of network(s) 930).

Figure 17:
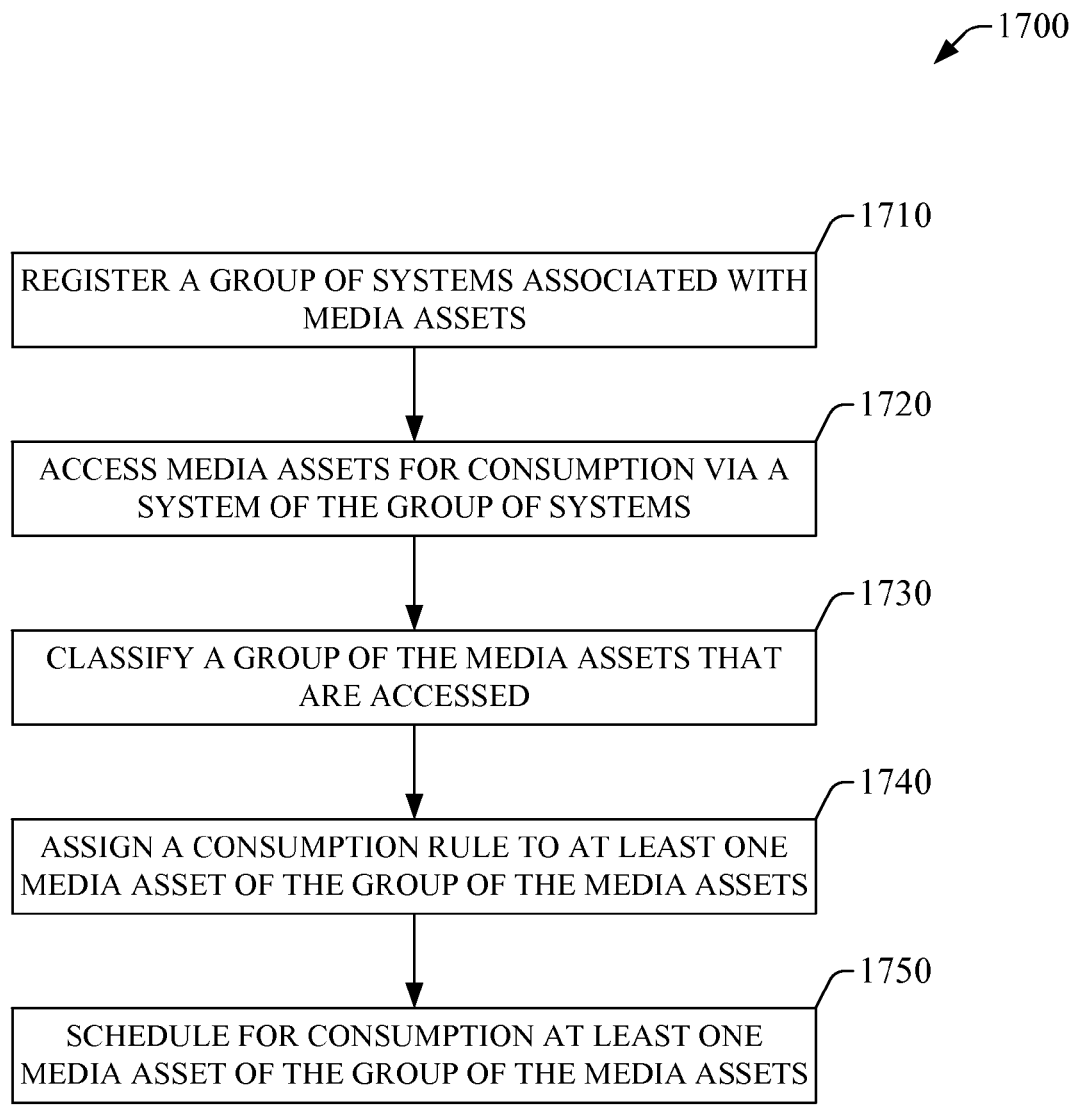

FIG. 17 presents a flowchart of an example of a method 1700 for shaping content (e.g., media assets) according to at least certain aspects of the disclosure. In certain embodiments, a computing platform (e.g., example computing platform in FIG. 13) having one or more processors coupled (individually or in groups) with one or more memory devices can implement one or more blocks of the subject example method. At block 1710, register a group of systems associated with media assets (e.g., audio assets, image assets, video assets, and the like). At block 1720, media assets for consumption via a system of the group of systems can be accessed. At block 1730, a group of the media assets that are accessed can be classified. At block 1740, a consumption rule can be assigned to at least one media asset of the group of media assets that are accessed. At block 1750, at least one media asset of the group of media assets can be scheduled for consumption. Each of the blocks 1730 through 1750 can be referred to as shaping operations and when implemented, permit conditioning one or more media assets for consumption.

Figure 18:
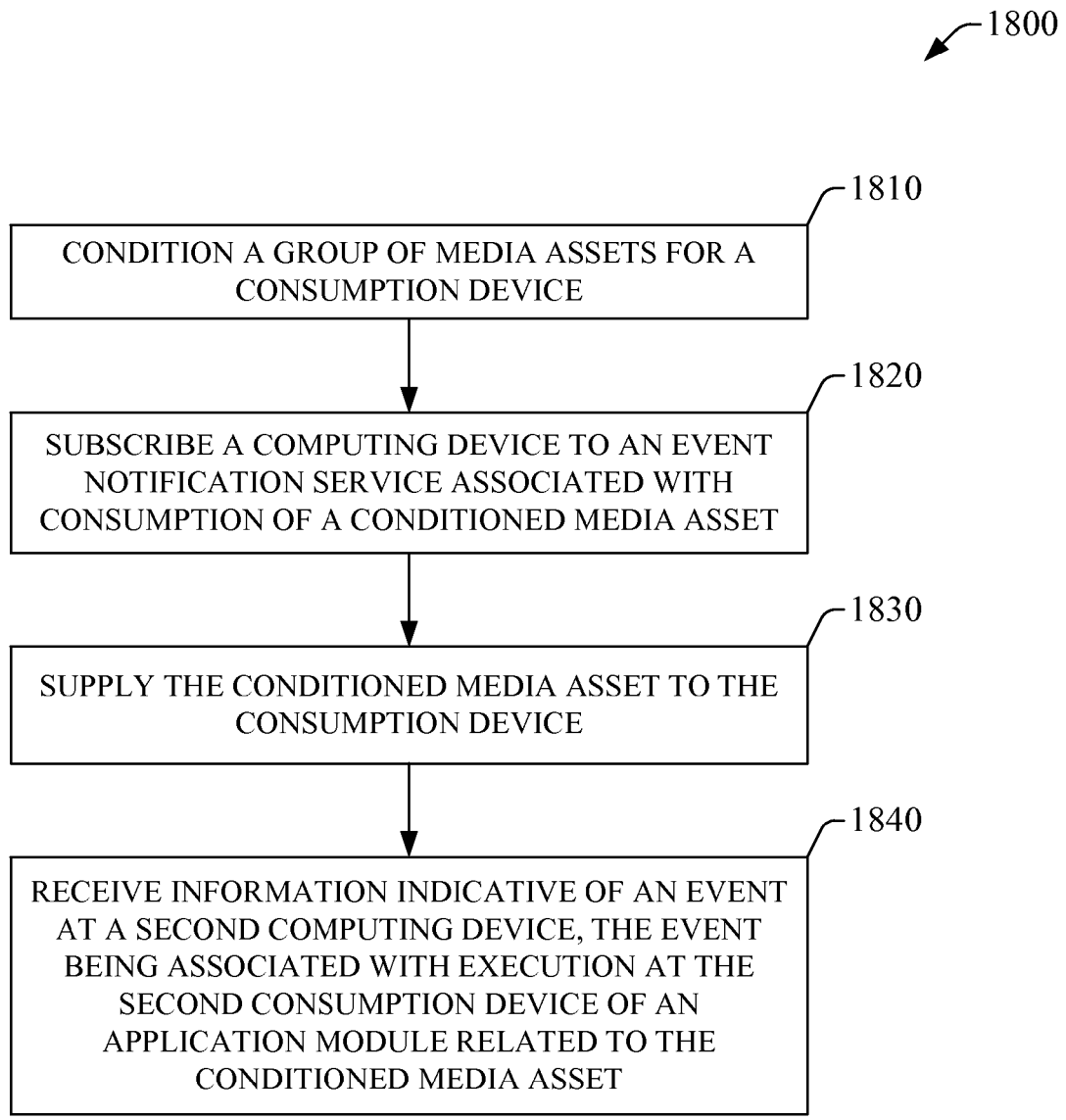

FIG. 18 presents a flowchart of an example of a method 1800 for consuming content (e.g., media assets) according to at least certain aspects of the disclosure. In certain embodiments, a computing platform (e.g., example computing platform in FIG. 13) having one or more processors coupled (individually or in groups) with one or more memory devices can implement one or more blocks of the subject example method. At block 1810, a group of media assets can be conditioned for a consumption device, where such a group can include one or more of at least one linear media asset, at least one on-demand media asset, or at least one time-shifted media asset. At block 1820, a computing device can be subscribed to an event notification service associated with consumption of a conditioned media asset of the group of media assets. At block 1830, the conditioned media asset of the group of media assets can supplied or otherwise provided. At block 1840, information indicative of an event can be received at a second computing device, wherein the event is associated with execution at the second consumption device of an application module related to the conditioned media asset.

Figure 19:
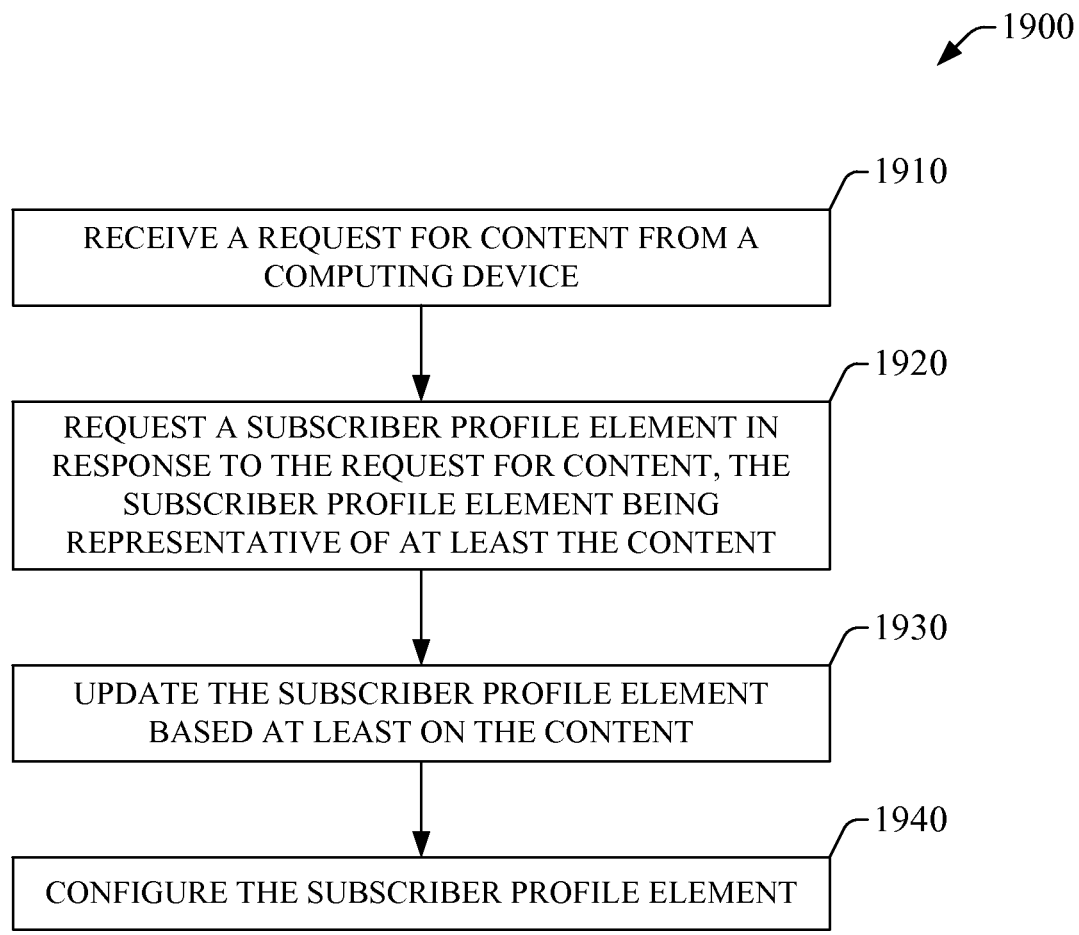

FIG. 19 presents a flowchart of an example of a method 1900 for generating a recommendation for content according to at least certain aspects of the disclosure. In certain embodiments, a computing platform (e.g., example computing platform in FIG. 13) having one or more processors coupled (individually or in groups) with one or more memory devices can implement one or more blocks of the subject example method. At block 1910, a request for content can be received from a computing device. At block 1920, a subscriber profile element can be requested or otherwise received in response to the request for content, where the subscriber profile element can be embodied in or can include information indicative or otherwise representative of at least the content. At block 1930, the subscriber profile element can be updated or generated based at least on the content. In scenarios in which the subscriber profile element is presents in a subscriber profile, updating such an element can include generating a revised version of the subscriber profile element. In scenarios in which the profile element is not present in the subscriber profile, updating such an element comprises generating the subscriber profile element. At block 1940, the subscriber profile element can be configured or provided. Configuring such an element may be referred to as generating a recommendation.

Figure 20:
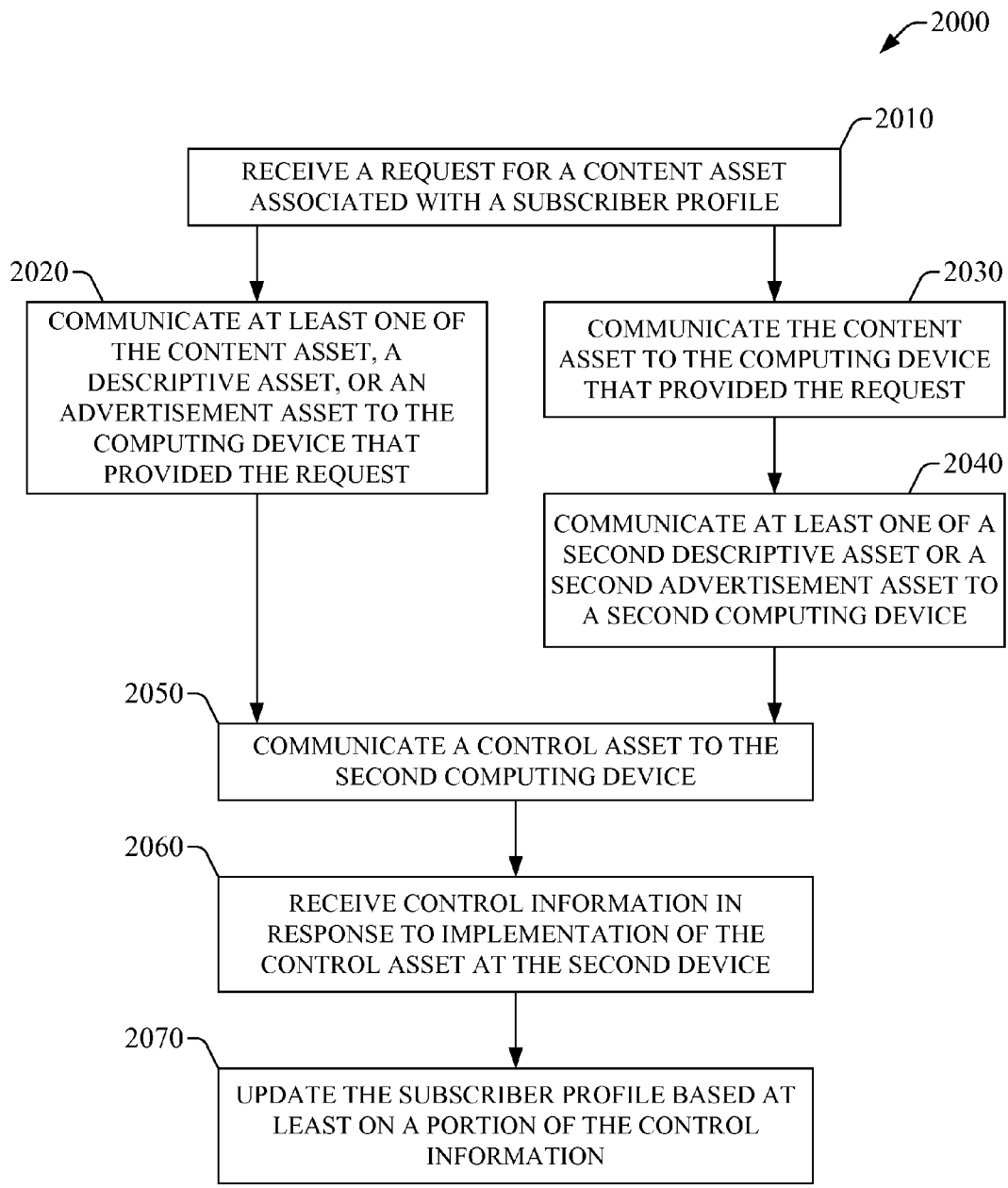

FIG. 20 presents a flowchart of another example of a method 2000 for generating recommendations according to at least certain aspects of the disclosure. In certain embodiments, a computing platform (e.g., example computing platform in FIG. 13) having one or more processors coupled (individually or in groups) with one or more memory devices can implement one or more blocks of the subject example method. At block 2010, a request for a content asset associated with a subscriber profile or element thereof can be received from a computing device. In certain embodiments, the computing device can be embodied in or can comprise customer premises equipment (CPE). At block 2020, at least one of the content asset, a descriptive asset associated with the content asset, or an advertisement asset can be communicated (e.g., transmitted) to the computing device. In the alternative, the content asset can be communicated (e.g., transmitted) to the computing device at block 2020, and at least one of a second descriptive asset associated with the content asset or a second advertisement asset can be communicated (e.g., transmitted) to a second computing device. In certain embodiments, the second computing device can be embodied in or can include CPE or a wireless computing device. At block 2050, a control asset can be communicated (e.g. transmitted) to the second computing device, where the control asset can be associated with the content asset. The control asset can be configured to receive control information from the second computing device in response to implementation (e.g., execution) of the control asset. At block 2060, at least a portion of the control information can be received in response to implementation of the control asset. As described herein, such information can be received at the computing platform that implements the subject example method. At block 2070, the subscriber profile can be updated based at least in part on at least the portion of the control information.

Figure 21:
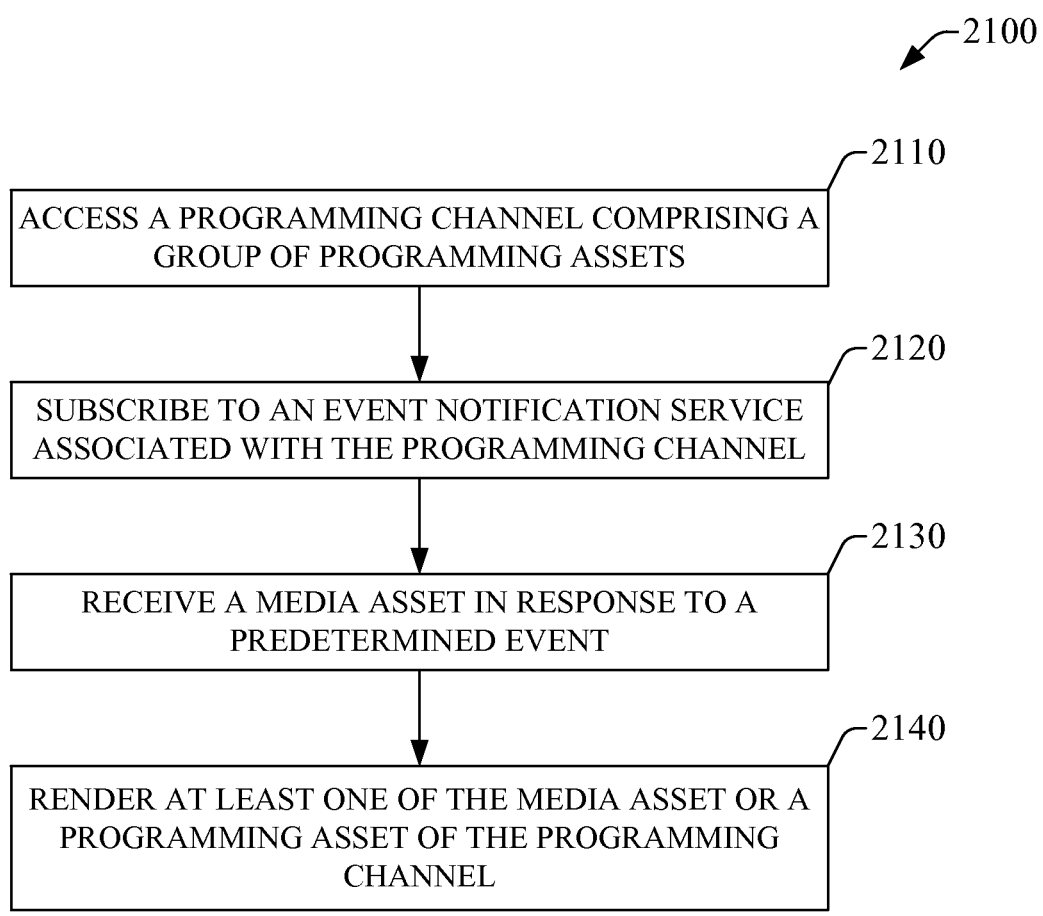

FIG. 21 presents a flowchart of an example of a method 2100 for consuming content according to at least certain aspects of the disclosure. In certain embodiments, a computing device (e.g., device B 540, which can be embodied or constituted by the computing device 1310 in FIG. 13) having one or more processors coupled (individually or in groups) with one or more memory devices can implement one or more blocks of the subject example method. At block 2110, a programming channel comprising a group of programming assets can be accessed. As described herein, in one example, the programming channel can be a thematic channel and the programming asset can include a linear media asset, an on-demand media asset, and/or a time-shifted media asset. At block 2120, the computing device that implements the subject example method can subscribe to an event notification service associated with the programming channel. As described herein, in one example, the event notification service can be provided by one or more units (e.g., pub-sub service unit(s) 604). At block 2130, a media asset can be received in response to a predetermined event. In one example, the media asset can be associated with at least one programming asset of the group of programming assets. In another example, the media asset can contain one or more of an advertisement, a coupon, instructional content, an image, a video segment, an audio segment, a link to web location, and the like. At block 2140 at least one of the media asset or a programming asset of the at least one programming asset can be rendered at the computing device that implements the subject example method, for example.

In certain embodiments, as described herein, the example method 2100 can include information representative of a processing action that can be communicated in response to the media asset being rendered. In one aspect, at least a portion of such information can be communicated to a network component integral to or functionally coupled to an access server (e.g., a server of the access server(s) 150). Such a network component can route or otherwise communicate at least the portion of the information to a content consumption platform in accordance with the disclosure. Based at least in part on at least the portion of the information, the content consumption platform can route or otherwise communicate such information to a third-party platform. In one aspect, the third-party platform can process the information that is received and, depending at least on an outcome of the processing, the third party platform can provide a response (e.g., post-processing information) to the computing device that implements the subject example method. In one example, the processing action can include submitting information to a social media platform, which can embody or can constitute the third-platform described herein. In another example, the processing action can include submitting a response to a survey contained in the media asset. In yet another example, the processing information can include submitting transaction information indicative of a commercial transaction associated with the media asset. For instance, the transaction information can include payment information (e.g., credit card information, bank information, identifying information, a combination thereof, or the like) associated with a one-time purchase, a subscription purchase, or the like.

In additional or alternative embodiments, the subject example method 2100 can include one or more blocks at which a control asset associated with the programming asset can be communicated. In one example, the control asset can control reproduction (e.g., playback, advancement, or retreat) of at least one programming asset of the group of programming assets that is being rendered at a computing device (e.g., a first-screen device, such as CPE, a desktop computer, a terminal device, or the like) other than the computing device that implements the subject example method.

In other embodiments, the subject example method 2100 can include one or more blocks at which information indicative of a control asset can be received, where the control asset is configured to transfer viewing from the computing device that implements the subject example method to a second computing device. In addition, at least a portion of the information indicative of the control asset can be communicated.

In yet other embodiments, the subject example method 2100 can include one or more blocks at which information indicative of a control asset configured to modify reproduction of a programming asset can be received, where the programming asset can be contained within the group of programming assets. In one example, modified reproduction of the programming asset can include a switch to a specific media asset (e.g., an on-demand media asset, a promotional asset, a combination thereof, or the like), forwarding the programming asset, or rewinding the programming asset.

In still other embodiments, the subject example method 2100 can include one or more blocks at which a search query for content associated with a programming channel of the group of the programming channels can be communicated. In addition, in one example implementation, at least one recommendation for at least one product associated with the programming asset can be received in response to the search query. For instance, the programming asset can be embodied in an episode of a competitive cooking show (e.g., Iron Chef America) in which a celebrity chef competes, and the computing device that implements the subject example method 2000 can receive input information indicative of a search query directed at least to identifying or otherwise acquiring information about restaurant owned and/or managed by the celebrity chef. In response to such a query, a recommendation for one or more products, such as a cookbook of the celebrity chef, can be received.

In addition to the embodiments described herein, the disclosure provides, in one additional or alternative embodiment, a system, distributed or localized, including at least one processor functionally coupled to at least one memory device in accordance with this disclosure and annexed drawings, where the system can implement any of the methods described herein or in the preceding claims.

In another additional or alternative embodiment, the disclosure provides a network including at least one computing device functionally coupled to at least one storage device in accordance with this disclosure and annexed drawings, where the network can implement any of the methods described herein or in the preceding claims.

In another additional or alternative embodiment, the disclosure provides a computing device including at least one processor functionally coupled to at least one memory device in accordance with this disclosure and annexed drawings, where the network can implement any of the methods described herein or in the preceding claims.

In another additional or alternative embodiment, the disclosure provides at least one computer-readable medium having instructions encoded thereon that, in response to execution by at least one processor, cause the at least one processor to perform operations comprised in any method of the preceding claims or described herein.

In another additional or alternative embodiment, the disclosure provides at least one computer-readable medium having instructions encoded thereon that, in response to execution by at least one processor, cause the at least one processor to perform any method of the preceding claims or described herein.

Several advantages over conventional technologies for shaping and distribution of digital content and/or consumption thereof emerge from the present specification and annexed drawings. One example advantage may include configuration and/or communication of content. Another example advantage may include a rich customization of content based on behavioral aspects of a consumer of content, where behavior of a consumer can be identified at least via consumption activity and consumer-driven configuration of content for consumption.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and techniques (procedures, methods, processes, and the like) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "engine," "platform," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," "platform," and "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer-program products that can provide content shaping and distribution of digital content and/or consumption thereof. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method for consuming content, comprising:
    accessing, by a first computing device comprising at least one processor functionally coupled to at least one memory device, from a service provider platform, a programming channel comprising a group of programming assets associated with one or more subscriber profile elements present in a subscriber profile, wherein the first computing device is in communication with the service provider platform over a network;
    subscribing, by the first computing device, to an event notification service associated with the programming channel;
    receiving, by the first computing device, a media asset associated with at least one programming asset of the group of programming assets responsive to a predetermined event;
    rendering, at the first computing device, at least one of the media asset or a programming asset of the at least one programming asset;
    receiving, at the first computing device, information indicative of a control asset configured to transfer viewing from the first computing device to a second computing device, wherein the control asset controls reproduction of the media asset at the second computing device;
    communicating, to the second computing device, the control asset;
    receiving control information from the second computing device, wherein the control information is indicative of metadata used by the control asset for management of the media asset and
    updating the subscriber profile with at least the control information from the second computing device.

2. The method of claim 1, further comprising communicating information representative of a processing action in response to rendering the media asset, wherein the processing action comprises one or more of submitting information to a social media platform, submitting a response to a survey contained in a second media asset, or submitting transaction information indicative of a commercial transaction associated with the second media asset.

3. The method of claim 1, wherein the programming channel is a thematic channel based upon the one or more subscriber profile elements present in the subscriber profile and the programming asset comprises one of a linear media asset, an on-demand media asset, or a time-shifted media asset.

4. The method of claim 1, further comprising communicating a search query for content associated with the programming channel.

5. The method of claim 4, further comprising receiving a recommendation for a product associated with the programming asset in response to the search query.

6. A device for content consumption, comprising:
    at least one memory device comprising having computer-executable instructions encoded thereon; and
    at least one processor functionally coupled to the at least one memory device and configured, by at least the computer-executable instructions to:
        access, from a service provider platform, a programming channel comprising a group of programming assets associated with one or more subscriber profile elements present in a subscriber profile, wherein the device is in communication with the service provider platform over a network;
        subscribe to an event notification service associated with the programming channel;
        receive a media asset associated with at least one programming asset of the group of programming assets responsive to a predetermined event;
        render at least one of the media asset or a programming asset of the at least one programming asset;
        receive information indicative of a control asset configured to transfer viewing from the device to another device, wherein the control asset controls reproduction of the media asset at the another device;

communicate the control asset to the another device;

receive control information from the another device, wherein the control information is indicative of metadata used by the control asset for management of the media asset, and update the subscriber profile with at least the control information from the another computing device.

7. The device of claim 6, wherein the at least one processor is further configured to communicate information representative of a processing action in response to rendering the media asset, wherein the processing action comprises one or more of submitting information to a social media platform, submitting a response to a survey contained in a second media asset, or submitting transaction information indicative of a commercial transaction associated with the second media asset.

8. The device of claim 6, wherein the programming channel is a thematic channel and the programming asset comprises one of a linear media asset, an on-demand media asset, or a time-shifted media asset.

9. The device of claim 6, wherein the at least one processor is further configured to communicate a search query for content associated with the programming channel.

10. The device of claim 9, wherein the at least one processor is further configured to receive a recommendation for a product associated with the programming asset in response to the search query.

11. At least one non-transitory storage medium having instructions for content consumption encoded thereon that, in response to execution, cause at least one computing device having at least one processor to perform operations comprising:

accessing, from a service provider, a programming channel comprising a group of programming assets associated with one or more subscriber profile elements present in a subscriber profile, wherein the at least one computing device is in communication with the service provider over a network;

subscribing to an event notification service associated with the programming channel;

receiving a media asset associated with at least one programming asset of the group of programming assets responsive to a predetermined event;

rendering at least one of the media asset or a programming asset of the at least one programming asset;

receiving, at the at least one computing device, information indicative of a control asset configured to transfer viewing from the at least one computing device to at least one other computing device, wherein the control asset controls reproduction of the media asset at the at least one other computing device;

communicating, to the at least one other computing device the control asset;

receiving control information from the at least one other computing device, wherein the control information is indicative of metadata used by the control asset for management of the media asset; and updating the subscriber profile with at least the control information from the at least one other computing device.

12. The at least one non-transitory storage medium of claim 11, the operations further comprising communicating information representative of a processing action in response to rendering the media asset, wherein the processing action comprises one or more of submitting information to a social media platform, submitting a response to a survey contained in a second media asset, or submitting transaction information indicative of a commercial transaction associated with the second media asset.

13. The at least one non-transitory storage medium of claim 12, wherein the programming channel is a thematic channel and the programming asset comprises one of a linear media asset, an on-demand media asset, or a time-shifted media asset.

14. The at least one non-transitory storage medium of claim 11, the operations further comprising communicating a search query for content associated with the programming channel.

15. The at least one non-transitory storage medium of claim 14, the operations further comprising receiving a recommendation for a product associated with the programming asset in response to the search query.

* * * * *